(12) United States Patent
Sparrow et al.

(10) Patent No.: US 8,236,158 B2
(45) Date of Patent: Aug. 7, 2012

(54) METHOD FOR DESALINATING SALTWATER USING CONCENTRATION DIFFERENCE ENERGY

(75) Inventors: Benjamin Stuart Sparrow, Vancouver (CA); Joshua Aniket Zoshi, Vancouver (CA); James Hing Bong Tang, Port Moody (CA)

(73) Assignee: Saltworks Technologies Inc., Vancouver, BC (CA)

( * ) Notice: Subject to any disclaimer, the term of this patent is extended or adjusted under 35 U.S.C. 154(b) by 231 days.

(21) Appl. No.: 12/757,382

(22) Filed: Apr. 9, 2010

(65) Prior Publication Data

US 2011/0089036 A1    Apr. 21, 2011

Related U.S. Application Data

(60) Provisional application No. 61/168,002, filed on Apr. 9, 2009.

(51) Int. Cl.
*B01D 61/44* (2006.01)
(52) U.S. Cl. .......... 204/523; 204/522; 204/529; 429/14
(58) Field of Classification Search ................ 204/523, 204/522, 529; 429/14, 51
See application file for complete search history.

(56) References Cited

U.S. PATENT DOCUMENTS

| | | | |
|---|---|---|---|
| 2,947,688 A * | 8/1960 | Murphy | ......... 210/638 |
| 3,300,393 A | 1/1967 | Fisher | |
| 3,341,441 A | 9/1967 | Giuffrida et al. | |
| 3,587,227 A | 6/1971 | Weingarten et al. | |

(Continued)

FOREIGN PATENT DOCUMENTS

CA    2649873    4/2009

(Continued)

OTHER PUBLICATIONS

The IPRP issued in respect of the corresponding PCT application, PCT/CA2009/000080, Apr. 23, 2010.

(Continued)

*Primary Examiner* — Arun S Phasge
(74) *Attorney, Agent, or Firm* — Ryan A. Schneider, Esq.; Troutman Sanders LLP

(57) ABSTRACT

Described herein are a method and system for desalinating saltwater using concentration difference energy. A "five stream" dialytic stack is described that can be used to desalinate saltwater at a relatively high recovery ratio. The dialytic stack may include, for example, one or more drive cells having a paired concentrate and a diluent-c chamber in ionic communication with a product chamber that is adjacent to an anion and a cation discharge chamber each filled with diluent-p. The drive cell applies a drive voltage across the product chamber, and when the drive voltage exceeds a desalination voltage of the product chamber, the saltwater in the product chamber is desalinated. The diluent-p may be at a lower ionic concentration than the diluent-c, which may be at a lower concentration than the concentrate. The relatively high concentrations of the concentrate and the diluent-c facilitate a relatively high recovery ratio, while the relatively low concentration of the diluent-p facilitates a relatively low desalination voltage. The dialytic stack may accept brine discharged from a first desalination plant and may use this brine as a source of the concentrate, diluent-c, or diluent-p. Alternatively, the dialytic stack may accept the brine as saltwater to be desalinated, and may then output desalinated brine back to the first desalination plant for further desalination. Processing the brine in the dialytic stack may decrease its volume, decreasing costs associated with treating or otherwise disposing of the brine.

15 Claims, 9 Drawing Sheets

U.S. PATENT DOCUMENTS

| | | | |
|---|---|---|---|
| 4,141,825 | A | 2/1979 | Conger |
| 4,171,409 | A | 10/1979 | Loeb |
| 4,225,413 | A | 9/1980 | Karn |
| 4,704,189 | A | 11/1987 | Assaf |
| 4,832,115 | A | 5/1989 | Albers et al. |
| 5,123,481 | A | 6/1992 | Albers et al. |
| 5,755,102 | A | 5/1998 | Assaf et al. |
| 6,185,940 | B1 | 2/2001 | Prueitt |
| 6,804,962 | B1 | 10/2004 | Prueitt |
| 2006/0225420 | A1 | 10/2006 | Al-Mayahi et al. |
| 2006/0263646 | A1 | 11/2006 | Seale |
| 2007/0034514 | A1 | 2/2007 | Riera |

FOREIGN PATENT DOCUMENTS

| | | |
|---|---|---|
| EP | 1233004 | 1/2005 |
| GB | 746609 | 3/1956 |
| WO | 2007009196 | 1/2007 |
| WO | PCT/CA2009/000080 | 1/2009 |

OTHER PUBLICATIONS

The ISR, WO and citable art referenced therein issued in respect of PCT CA/2010/000537 and of a Canadian Office Action issued in respect of CA 2,699,174, Jun. 28, 2010.

George W. Murphy, "Osmionic Demineralization", Ind. Eng. Chem., 1958, 50 (8), pp. 1181-1188.

The Nov. 22, 2010 Office Action in related case CA 2,699,174.

Sergio Ferreira, "Reverse Electrodialysis", submitted Sep. 21, 2007, http://www.leonardo-energy.org/drupal/node/2248, pp. 1-2.

"Tapping the Oceans", Economist.com., Science Technology Quarterly, Jun. 5, 2008, pp. 1-6.

John N. Weinstein et al., "Electric Power from Differences in Salinity: The Dialytic Battery", Science, Feb. 13, 1976, vol. 191, pp. 557-559.

Benjamin S. Sparrow, "Empirical Equations for the Thermodynamic Properties of Aqueous Sodium Chloride", Journal of Desalination, Jan. 10, 2003, vol. 159, Issue 2, pp. 161-170.

EDI Spiral from Dow Water Solutions, http://www.dow.com/liquidseps/prod/edi_index.htm, Mar. 13, 2009.

Joost Veerman, "Power Generation by Reverse Electro Dialysis (RED): System Design", http://net2client.hscg.net/ZZZ/08/08200/Enerby%20Joost%20Veerman.pdf.

J. Veerman et al., "Reducing Power Losses Caused by Ionic Shortcut Currents in Reverse Electrodialysis Stacks by a Validated Model", Journal of Membrane Science, Mar. 5, 2008, vol. 310, Issue 1-2, pp. 418-430.

M. Turek et al., "Renewable Energy by Reverse Electrodialysis", ScienceDirect, Journal of Desalination, Feb. 5, 2007, Vol. 205, Issues 1-3, pp. 67-74.

J. Schechter et al., "Conceptual Design Study on Electrodialysis Membrane Assembly Modular Unit Design", Research and Development Progress Report No. 681, U.S. Department of Interior, 1971.

Piotr Dlugolecki et al., "Current Status of Ion Exchange Membranes for Power Generation from Salinity Gradients", Journal of Membrane Science, Jul. 1, 2008, Vol. 319, Issues 1-2, pp. 214-222.

Wikipedia Article, "Blue Energy", http://en.wikipedia.org/wiki/Reverse_electrodialysis, pp. 1-3, Jul. 23, 2008.

* cited by examiner

Figure 6

METHOD FOR DESALINATING SALTWATER USING CONCENTRATION DIFFERENCE ENERGY

CROSS-REFERENCE TO RELATED APPLICATIONS

This application claims the benefit of U.S. Provisional Application No. 61/168,002, filed 9 Apr. 2009, and of the Canadian Application 2,699,174, filed on 8 Apr. 2010, which are hereby incorporated by reference in their entirety as if fully set forth below.

BACKGROUND OF THE INVENTION

1. Field of the Invention

The present disclosure is directed at a method and system for desalinating saltwater using concentration difference energy. More particularly, the present disclosure is directed at a method and system for desalinating saltwater utilizing a dialytic stack designed to desalinate saltwater at a relatively high recovery ratio.

2. Description of Related Art

Over one quarter of Earth's population does not have adequate access to freshwater. Inadequate access to freshwater is detrimental, as it can lead to disease and malnutrition, limit agricultural development, and inhibit economic growth.

In contrast to freshwater, saltwater is readily available. Saltwater in the form of seawater constitutes about 97% of the water on Earth. Unless seawater is sufficiently desalinated, though, it is not only undrinkable but unsuitable for agriculture. "Desalination" refers to the process of removing anions and cations from saltwater. Seawater typically has a salt concentration of about 3.5% by mass; that is, about 35 grams of dissolved salt per liter of water. Another source of saltwater is salty, underground aquifer water, also known as "brackish water". The salt concentration of brackish water typically ranges from less than 1% to more than 18% salt by mass. In contrast, drinkable water typically has a salt concentration of, at most, about 0.04%.

Several desalination methods are known in the art. One of the most popular methods at present is reverse osmosis ("RO"). RO involves mechanically forcing saltwater through spirally wound, semi-permeable membranes at high pressure. The membranes reject salt from the saltwater to produce both streams of freshwater and a salty, wastewater stream known as "brine". Saltwater that is desalinated using RO requires extensive pre-treatment, however, which increases RO's energy requirements. RO also suffers from performance issues when the temperature of the saltwater is over about 30° C., which can be the case when the saltwater source is water from a warm ocean or power plant inlet, for example.

Another popular method of desalination is multiple effect distillation ("MED") or multi-stage flash ("MSF"). MED and MSF desalinate saltwater by repeatedly evaporating and condensing the saltwater over a series of multiple stages. The source of the energy for MED and MSF processes is usually low pressure steam. The primary drawback of MED and MSF processes is the large amount of thermal energy they consume, which is typically an order of magnitude higher than that used by RO.

Another popular method of desalination is electrodialysis reversal ("EDR"), in which an electric current migrates dissolved salt ions through an electrodialysis stack composed of alternating anion and cation exchange membranes. One problem that occurs when desalinating saltwater using EDR and other methods that utilize ion exchange membranes is that the ion exchange membranes accumulate scaling over time, which inhibits desalination performance. Consequently, removing the scaling from the ion exchange membranes in an efficient manner is desirable.

Furthermore, all desalination processes produce brine in addition to freshwater. This brine typically has a salt mass concentration of about 7% for seawater desalination plants, and is of environmental concern as it is typically discharged back into a marine environment. Consequently, reducing one or both of the volume and concentration of brine from a saltwater plant would be beneficial.

BRIEF DESCRIPTION OF THE DRAWINGS

In the accompanying drawings, which illustrate one or more exemplary embodiments:

FIG. 6 is a schematic view of a second embodiment of the combined desalination plant of FIG. 5 that also includes a process plant that provides waste heat to the second desalination plant;

BRIEF SUMMARY OF THE INVENTION

Figure 1:
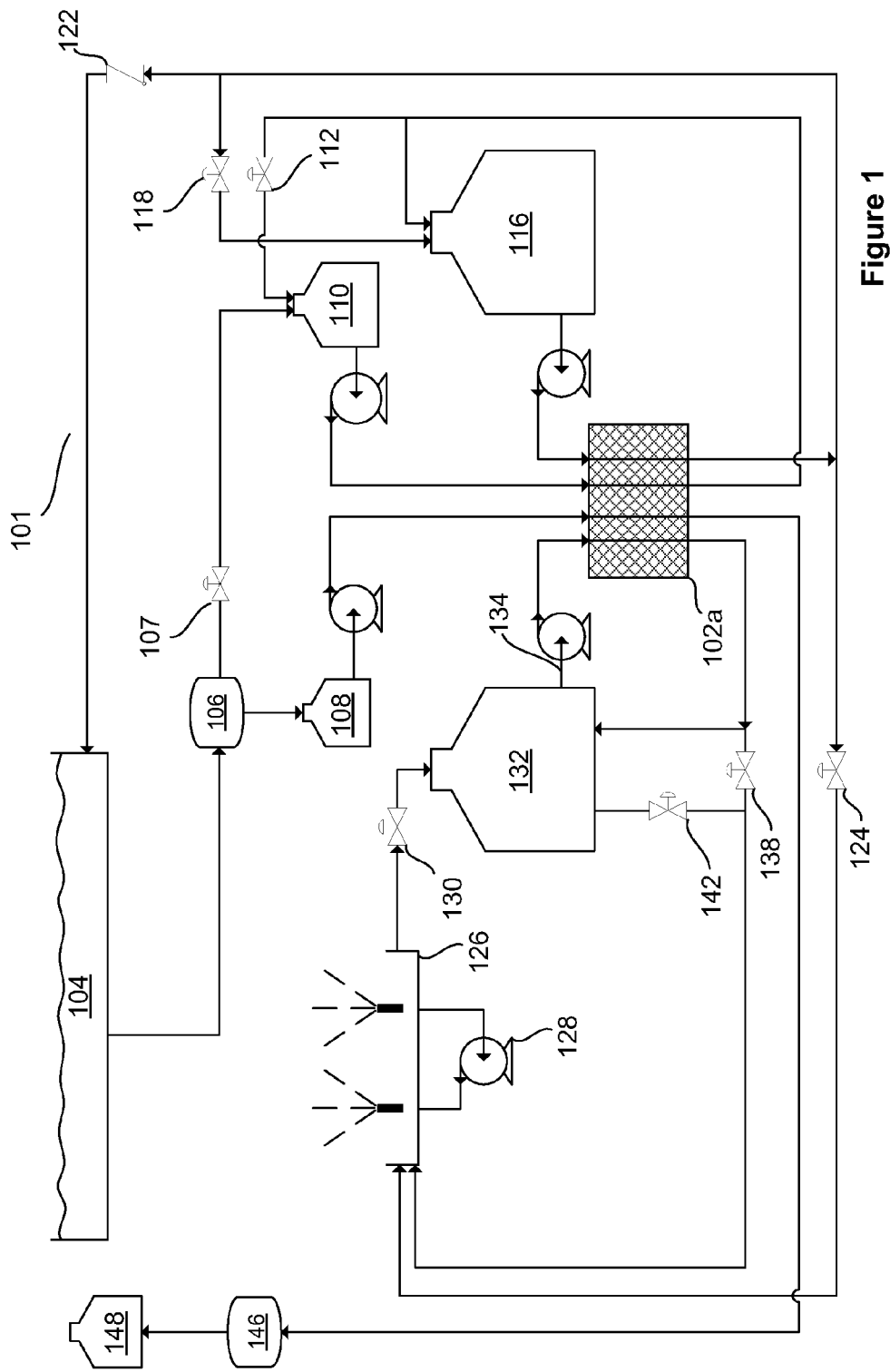
FIG. 1 is a schematic view of one embodiment of a plant that desalinates saltwater using concentration difference energy.

According to a first aspect, there is provided a method for desalinating saltwater. The method includes generating a drive voltage by flowing a concentrate solution through a concentrate chamber; flowing a diluent solution having an ionic concentration lower than an ionic concentration of the concentrate solution through a diluent chamber, the concentrate and diluent chambers forming a drive cell and sharing one of an anion and cation exchange membrane such that anions or cations flow from the concentrate chamber to the diluent chamber through the exchange membrane; and applying a sufficient voltage that comprises the drive voltage across a first product chamber through which flows the saltwater to be desalinated and that is in ionic communication with the drive cell. The sufficient voltage equals or exceeds a desalination voltage of the first product chamber such that cations and anions respectively migrate from the first product chamber and into a first cation and first anion discharge chamber each bounding the first product chamber and respectively having flowing there through a first cation and first anion discharge solution. At least one of the first cation and first anion discharge solutions has an ionic concentration different from the ionic concentrations of the concentrate and diluent solutions.

According to another aspect, there is provided a method for desalinating saltwater. The method includes generating a drive voltage by flowing a concentrate solution through a concentrate chamber; and flowing a diluent solution having an ionic concentration lower than an ionic concentration of the concentrate solution through a diluent chamber, the concentrate and diluent chambers forming a drive cell and sharing one of an anion and cation exchange membrane such that anions or cations flow from the concentrate chamber to the diluent chamber through the exchange membrane. A sufficient voltage that comprises the drive voltage is applied across saltwater to be desalinated, the saltwater being in ionic communication with the drive cell, and the sufficient voltage equals or exceeds a desalination voltage of the saltwater such that cations and anions migrate from the saltwater and into a respective first cation discharge solution and first anion discharge solution which are respectively in cationic and anionic communication with the saltwater. At least one of the first cation and first anion discharge solutions has a lower ionic concentration than the ionic concentrations of the concentrate and diluent solutions.

Modifications to the above aspects are possible, as described below. For example, the first product chamber may share a first product chamber anion exchange membrane and a first product chamber cation exchange membrane with the first anion discharge chamber and the first cation discharge chamber, respectively, and the cations may migrate from the first product chamber to the first cation discharge chamber through the first product chamber cation exchange membrane and anions may migrate from the first product chamber to the first anion discharge chamber through the first product chamber anion exchange membrane.

The diluent solution, the concentrate solution, and the first anion and first cation discharge solutions may all be saltwater.

One or both of the ionic concentrations of the first anion and first cation discharge solutions may be less than the ionic concentration of the diluent solution.

The first anion and first cation discharge solutions may be a common discharge solution.

The sufficient voltage may also be applied across a second product chamber through which also flows the saltwater being desalinated and that is in ionic communication with the drive cell. When desalination occurs, the sufficient voltage equals or exceeds a sum of the desalination voltage of the first product chamber and a desalination voltage of the second product chamber such that cations and anions migrate from the second product chamber and into a second cation and second anion discharge chamber each bounding the second product chamber and having flowing there through a second cation and second anion discharge solution, respectively. In this aspect, the cation discharge chamber of one of the product chambers is also the anion discharge chamber of the other of the product chambers.

The second anion discharge chamber may contain the diluent solution.

One or both of the ionic concentrations of the first anion and first cation discharge solutions may be less than the ionic concentration of the diluent solution.

The chambers may periodically be de-scaled by desalinating saltwater by flowing the concentrate solution through the diluent chamber; flowing the diluent solution through the concentrate chamber; flowing the saltwater to be desalinated through the first cation and first anion discharge chambers; flowing the first anion discharge solution through the second product chamber; and flowing the first cation discharge solution through the first product chamber.

The exchange membrane of the drive cell may have a lower ionic selectivity and higher conductivity than at least one of the first product chamber anion and cation exchange membranes.

When the discharge solution is above a discharge solution concentration threshold, the discharge solution may be diluted prior to flowing it through the discharge chambers by mixing it with saltwater having a concentration less than the discharge solution concentration threshold.

When the diluent solution is above a diluent concentration threshold, the diluent solution may be diluted prior to flowing it through the diluent chamber by mixing it with the discharge solution exiting one or both of the discharge chambers.

When the concentrate solution is below a concentrate concentration threshold, ionic concentration of the concentrate solution may be increased prior to flowing the concentration solution through the concentrate chamber by evaporating a portion of the concentrate solution to air.

Following the concentrate solution exiting the concentrate chamber, the volume of the concentrate solution may be decreased by evaporating a portion of the concentrate solution to air.

Following the diluent solution exiting the diluent chamber, the ionic concentration of the diluent solution may be increased by evaporating a portion of the diluent solution to air and then the diluent solution may be mixed with the concentrate solution prior to flowing the concentrate solution through the concentrate chamber.

Increasing the ionic concentration of the diluent solution or concentrate solution may be performed over a plurality of reconcentration stages.

Prior to increasing the ionic concentration of the diluent solution or concentrate solution, the diluent solution or concentrate solution may be heated using waste heat from a process plant to facilitate evaporation to air.

The first product chamber may be at a higher pressure than the concentrate chamber, the diluent chamber, and the first anion and first cation discharge chambers.

An electrolyte may be flowed through anode and cathode electrolyte chambers, the anode electrolyte chamber bounded on a first side by an anode stack end ion exchange membrane and bounded on another side by an anode, and the cathode electrolyte chamber bounded on a first side by a cathode stack end ion exchange membrane and bounded on another side by a cathode, the anode and cathode electrolyte chambers ionically communicative with the first product chamber via the anode and cathode stack end ion exchange membranes, respectively, and the anode and cathode may be electrically communicative with each other such that electrons flow from the anode to the cathode. The anode and cathode electrolyte chambers may be at a lower pressure than the concentrate chamber, the diluent chamber, the first anion and first cation discharge chambers, and the product chamber.

Detecting seepage of the first product chamber may be performed by comparing an input mass flow rate of the saltwater being desalinated upon entering the first product chamber to an output mass flow rate of the saltwater being desalinated upon exiting the first product chamber; and identifying seepage as occurring when the input mass flow rate is greater than the output mass flow rate by a flow rate threshold.

Brine output from a desalination plant may be used as a source of the concentrate solution.

The brine output may be used as a source of the saltwater being desalinated. Following exiting the first product chamber, the saltwater being desalinated may be returned to the desalination plant for further desalination.

The brine output may have an ionic concentration between that of the concentrate solution and the diluent solution.

The brine output may be used as a source of any one or more of the diluent solution and the first anion and first cation discharge solutions.

Saltwater may be desalinated using a plurality of dialytic stacks configured to desalinate saltwater according to any of the foregoing aspects. This can be done by flowing in a first direction through the dialytic stacks the concentrate solution, a common discharge solution, and the saltwater to be desalinated through the concentrate chambers, the first anion and first cation discharge chambers, and the first product chambers, respectively, of the dialytic stacks; flowing in a second direction countercurrent to the first direction through the dialytic stacks the diluent solution through the diluent chambers of the dialytic stacks; and decreasing volume of the concentrate solution by evaporating a portion of the concentrate solution to air.

Following flowing the diluent solution through the diluent chambers of all of the dialytic stacks, the volume of diluent solution may be decreased by evaporating a portion of the diluent solution to air.

The concentrate solution, the saltwater being desalinated, and the diluent solution may flow through each of the dialytic stacks in series, and the common discharge solution may flow through each of the dialytic stacks in parallel.

The saltwater being desalinated and the diluent solution may flow through each of the dialytic stacks in series, and the common discharge solution and the concentrate solution may flow through each of the dialytic stacks in parallel.

According to another aspect, there is provided an apparatus for a saltwater desalinating system. The apparatus includes a drive cell for generating a drive voltage, the drive cell comprising a diluent chamber, a concentrate chamber, and one of a cation and anion exchange membrane forming a shared boundary between the diluent and concentrate chambers such that when the drive voltage is being generated cations or anions migrate from the concentrate chamber to the diluent chamber; a first product chamber anion exchange membrane and a first product chamber cation exchange membrane; a first anion discharge chamber and a first cation discharge chamber; a first product chamber for containing the saltwater being desalinated, the first product chamber sharing the first product chamber anion exchange membrane with the first anion discharge chamber and sharing the first product chamber cation exchange membrane with the first cation discharge chamber such that when the saltwater is being desalinated anions and cations migrate from the first product chamber and into the first anion and first cation discharge chambers via the first product chamber anion and first product chamber cation discharge membranes, respectively. The first product chamber is in ionic communication with the drive cell via one of the first product chamber exchange membranes when the saltwater is being desalinated; and a manifolding assembly comprising diluent, discharge, concentrate and product manifolding fluidly coupled to the diluent, discharge, concentrate and product chambers, respectively, to convey diluent solution to and away from the diluent chamber, discharge solution to and away from the discharge chambers, concentrate solution to and away from the concentrate chamber, and the saltwater being desalinated to and away from the product chamber.

The apparatus may also include a second product chamber anion exchange membrane and a second product chamber cation exchange membrane; a second anion discharge chamber and a second cation discharge chamber; and a second product chamber for containing the saltwater being desalinated, the second product chamber sharing the second product chamber anion exchange membrane with the second anion discharge chamber and sharing the second product chamber cation exchange membrane with the second cation discharge chamber such that when the saltwater is being desalinated anions and cations migrate from the second product chamber and into the second anion and second cation discharge chambers via the second product chamber anion and second product chamber cation discharge membranes, respectively, and the second product chamber may be in ionic communication with the drive cell via one of the second product chamber exchange membranes when the saltwater is being desalinated. The second anion and second cation discharge chambers may be fluidly coupled to the discharge manifolding and the second product chamber is fluidly coupled to the product manifolding. The cation discharge chamber of one of the product chambers may also be the anion discharge chamber of the other of the product chambers.

The apparatus may also include a diluent chamber gasket, discharge chamber gaskets, a concentrate chamber gasket and a product chamber gasket circumscribing each of the diluent chamber, the discharge chambers, the concentrate chamber and the product chamber, respectively. Each of the diluent chamber, discharge chamber, concentrate chamber and product chamber gaskets may contain therein a spacer for maintaining separation of cation and anion exchange membranes.

The exchange membrane of the drive cell may have a lower ionic selectivity and higher conductivity than at least one of the product chamber anion and cation exchange membranes.

The chambers of the apparatus may be wound in a spiral shape.

The diluent, discharge, concentrate and product manifolding may respectively comprise diluent solution supply and exit conduits, discharge solution supply and exit conduits, concentrate solution supply and exit conduits, and a product feed supply conduit and a product exit conduit, each of which may respectively extend through the diluent, discharge, concentrate and product gaskets. The diluent chamber gasket may have inlet and outlet notches fluidly coupling the diluent solution supply and exit conduits, respectively, to the diluent chamber; the discharge chamber gaskets may have inlet and outlet notches fluidly coupling the discharge solution supply and exit conduits, respectively, to the discharge chambers; the concentrate chamber gasket may have inlet and outlet notches fluidly coupling the concentrate solution supply and exit conduits, respectively, to the concentrate chamber; and the product gasket may have inlet and outlet notches fluidly coupling the product feed supply and the product exit conduits, respectively, to the product chamber.

According to another aspect, there is provided a system for desalinating saltwater. The system includes a first desalination plant for desalinating saltwater and that has a brine discharge outlet; and a second desalination plant comprising a dialytic stack for desalinating the saltwater. The dialytic stack includes a drive cell for generating a drive voltage, the drive cell comprising a diluent chamber, a concentrate chamber, and one of a cation and anion exchange membrane forming a shared boundary between the diluent and concentrate chambers such that when the drive voltage is being generated cations or anions migrate from the concentrate chamber to the diluent chamber; a first product chamber anion exchange membrane and a first product chamber cation exchange membrane; a first product chamber for containing the saltwater being desalinated, the first product chamber bounded on one side by the first product chamber anion exchange membrane and bounded on another side by the first product chamber cation exchange membrane such that when the saltwater is being desalinated anions and cations migrate from the first product chamber and through the first product chamber anion and cation exchange membranes, respectively. The first product chamber is in ionic communication with the drive cell via one of the first product chamber exchange membranes when the saltwater is being desalinated; and a manifolding assembly comprising diluent, concentrate and product manifolding fluidly coupled to the diluent, discharge, concentrate and product chambers, respectively, to convey diluent solution to and away from the diluent chamber, concentrate solution to and away from the concentrate chamber, and the saltwater being desalinated to and away from the product chamber. The brine discharge outlet of the first desalination plant may be fluidly coupled to one or both of an inlet of the concentrate chamber such that brine can be used as the concentrate solution and an inlet of the first product chamber such that the first desalination plant can desalinate the brine.

The second desalination plant may have a reconcentrator fluidly coupled between the first desalination plant and the concentrate chamber to evaporate a portion of the brine to air to generate the concentrate solution.

An outlet of the first product chamber may be fluidly coupled to the first desalination plant to output desalinated brine to the first desalination plant for further desalination.

The dialytic stack may also include a first anion discharge chamber sharing the first product chamber anion exchange membrane with the first product chamber and a first cation discharge chamber sharing the first product chamber cation discharge membrane with the first product chamber such that when the saltwater is being desalinated anions and cations respectively migrate from the first product chamber and into the first anion and first cation discharge chambers via the first product chamber anion and first product chamber cation exchange membranes. The manifolding assembly may also include discharge manifolding fluidly coupled to the discharge chambers to convey discharge solution to and away from the discharge chambers.

The dialytic stack may also include a second product chamber anion exchange membrane and a second product chamber cation exchange membrane; a second anion discharge chamber and a second cation discharge chamber; and a second product chamber for containing the saltwater being desalinated, the second product chamber sharing the second product chamber anion exchange membrane with the second anion discharge chamber and sharing the second product chamber cation exchange membrane with the second cation discharge chamber such that when the saltwater is being desalinated anions and cations migrate from the second product chamber and into the second anion and second cation discharge chambers via the second product chamber anion and second product chamber cation discharge membranes, respectively. The second product chamber may be in ionic communication with the drive cell via one of the second product chamber exchange membranes when the saltwater is being desalinated. The second anion and second cation discharge chambers may be fluidly coupled to the discharge manifolding and the second product chamber is fluidly coupled to the product manifolding, and the cation discharge chamber of one of the product chambers may also be the anion discharge chamber of the other of the product chambers.

The exchange membrane of the drive cell may have a lower ionic selectivity than at least one of the product chamber anion and cation exchange membranes.

A discharge solution mixer may be fluidly coupled between an inlet of the discharge chambers and a source of solution having a concentration less than a discharge solution concentration threshold. The discharge solution mixer may be configured to mix the solution having the concentration less than the discharge solution concentration threshold and the discharge solution prior to the discharge solution entering the discharge chambers.

The system may also include a process plant comprising a source of waste heat; and a heat exchanger fluidly coupled between one or both of the outlet of the concentrate chamber and the outlet of the diluent chamber and the reconcentrator. The heat exchanger may be configured to heat one or both of the concentrate solution and the diluent solution to facilitate evaporation to air.

According to another aspect, there is provided a method for desalinating saltwater. The method includes obtaining brine discharged from a first desalination plant; and utilizing the brine in a second desalination plant configured to desalinate saltwater. Utilizing the brine may be done by generating a drive voltage by flowing a concentrate solution through a concentrate chamber; flowing a diluent solution having an ionic concentration lower than an ionic concentration of the concentrate solution through a diluent chamber, the concentrate and diluent chambers forming a drive cell and sharing one of an anion and cation exchange membrane such that anions or cations flow from the concentrate chamber to the diluent chamber through the exchange membrane; and applying a sufficient voltage that includes the drive voltage across a first product chamber through which flows the saltwater to be desalinated and that is in ionic communication with the drive cell. The sufficient voltage equals or exceeds a desalination voltage of the first product chamber such that cations and anions migrate out of the first product chamber through a first product chamber cation and a first product chamber anion exchange membrane, respectively. The saltwater to be desalinated in the first product chamber or the concentrate solution may include the brine.

The cations and anions may migrate out of the first product chamber and into a first cation and first anion discharge chamber each bounding the first product chamber and having flowing there through a first cation and first anion discharge solution, respectively. At least one of the first cation and first anion discharge solutions may have an ionic concentration different from the ionic concentrations of the concentrate and diluent solutions.

The first product chamber may share the first product chamber anion exchange membrane and the first product chamber cation exchange membrane with the first anion discharge chamber and the first cation discharge chamber, respectively. Cations may migrate from the first product chamber to the first cation discharge chamber through the first product chamber cation exchange membrane and anions may migrate from the first product chamber to the first anion discharge chamber through the first product chamber anion exchange membrane.

The sufficient voltage may be applied across a second product chamber through which also flows the saltwater being desalinated and that is in ionic communication with the drive cell. When the sufficient voltage equals or exceeds a sum of the desalination voltage of the first product chamber and a desalination voltage of the second product chamber, cations and anions migrate from the second product chamber and into a second cation and second anion discharge chamber each bounding the second product chamber and having flowing there through a second cation and second anion discharge solution, respectively. The cation discharge chamber of one of the product chambers may also be the anion discharge chamber of the other of the product chambers.

Prior to using the brine as the concentrate solution, a portion of the brine may be evaporated to air.

Desalinated brine may be output from the second desalination plant and circulated back to the first desalination plant for further desalination.

When either of the discharge solutions has a concentration greater than a discharge solution concentration threshold, the discharge solutions may be mixed with a solution having a concentration less than a discharge solution concentration threshold prior to flowing the discharge solutions through the discharge chambers.

When the diluent solution has a concentration greater than a diluent concentration threshold, the diluent solution may be mixed with the discharge solution exiting the discharge chambers prior to flowing the diluent solution through the diluent chambers.

The exchange membrane of the drive cell may have a lower ionic selectivity than at least one of the first product chamber anion and first product chamber cation exchange membranes.

One or both of the concentrate solution and the diluent solution may be heated using waste heat from a process plant; and then a portion of the one or both of the concentrate and diluent solutions may be evaporated to air.

Beneficially, the foregoing aspects in which the concentrate, diluent, discharge and product feed solutions are employed can facilitate production of freshwater at a relatively high recovery ratio. For example, when the diluent, concentrate and discharge solutions are all saltwater and the discharge solutions have a lower salt concentration than both of the diluent and concentrate solutions, the relatively high salt concentrations of the diluent and the concentrate contribute to a high recovery ratio while the relatively low salt concentration of the discharge solutions contributes to decreasing the desalination voltage of the product chambers.

Furthermore, in the foregoing aspects in which the brine output from the first desalination plant is desalinated using the dialytic stack, the volume of the resulting brine output from the combined desalination plant may have a lower volume than the brine output from the first desalination plant. Consequently, the cost of disposing of or otherwise treating the brine discharged from the combined desalination plant can be substantially lower than the cost of treating the brine discharged from the first desalination plant alone.

In the foregoing aspects in which the brine output from the first desalination plant is used to supply the concentrate for the dialytic stack, the amount of evaporation to air that is done on the brine in order to produce the concentrate used within the dialytic stack is reduced relative to when a solution having a lower ionic concentration than the brine is used as a source of the concentrate. Less evaporation to air translates to one or both of lower capital costs spent on reconcentrators used to increase the concentration of solutions used as the concentrate, and shorter evaporation times.

In the foregoing aspects in which brine that is desalinated to a certain degree by the dialytic stack is returned to the first desalination plant for further desalination, desalination of the brine may beneficially be done more economically and efficiently than if the first desalination plant alone is used for desalination.

DETAILED DESCRIPTION OF THE INVENTION

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural references unless the context clearly dictates otherwise.

Directional terms such as "top", "bottom", "upwards", "downwards", "vertically" and "laterally" are used in the following description for the purpose of providing relative reference only, and are not intended to suggest any limitations on how any apparatus is to be positioned during use, or to be mounted in an assembly or relative to an environment.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named, for example, device, compound, element, particle, or method step is present in the composition or article or method, but does not exclude the presence of other devices, compounds, materials, particles, method steps, even if the other such devices, compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in system does not preclude the presence of additional components or intervening components between those components expressly identified.

Desalination plants are used to reduce the salt content of saltwater. "Desalination" refers to the process of removing anions and cations from saltwater, but a reference to "desalinating" saltwater does not necessary mean that all the anions and cations are removed from the saltwater. For example, saltwater may be desalinated from 3.5% salt by mass to a level of 0.04% salt by mass, which is considered safely drinkable; alternatively, saltwater may be desalinated from 3.5% salt by mass to 2% or 1% salt by mass, for example. Although not considered drinkable, the saltwater has still been desalinated by a certain degree. For any given volume of desalinated saltwater that a desalination plant produces, a certain amount of saltwater is first input to the desalination plant. For example, U.S. patent application Ser. No. 12/360,714 (publication number US 20090314718), the entirety of which is hereby incorporated by reference herein, describes a plant for desalinating saltwater using concentration difference energy ("CDE plant") into which saltwater is input to produce concentrate and diluent solutions and to supply saltwater to be desalinated ("product feed"). The desalination plant outputs freshwater ("product"). As another example, a desalination plant that relies solely on reverse osmosis technology ("RO plant") accepts product feed and outputs product and a concentrate solution.

For any desalination plant, the ratio of the volume of product that is output to the volume of saltwater input to the plant that is used to generate this product is referred to as the "recovery ratio" of the desalination plant. For example, in the RO plant, the recovery ratio equals the volume of product produced divided by the volume of product feed used to generate this product. In the CDE plant, the recovery ratio equals the volume of product produced divided by the volume of product feed used to generate this product and the volume of saltwater used to produce the concentrate and diluent solutions.

Generally, when comparing two desalination plants that are otherwise identical, a desalination plant having a higher recovery ratio is advantageous over a desalination plant having a lower recovery ratio. The lower the recovery ratio of the desalination plant, the more saltwater input that the desalination plant uses to generate a certain volume of product, and accordingly the desalination plant requires a larger and more expensive saltwater intake and pre-treatment system. The higher the recovery ratio of the desalination plant, the higher the salt concentration of any brine discharge that the plant produces, which reduces the volume of brine that the desalination plant discharges. This is particularly beneficial when the desalination plant is used for inland desalination of brackish water.

Another design consideration when constructing desalination plants is how to manage organic and inorganic fouling of plant equipment. RO plants manage this by adding chemicals such as anti-scalants or anti-foulants, which adds to plant complexity, cost, and results in chemical contamination of the waste brine.

The embodiments described herein are directed at a CDE plant configured to facilitate reversal of ionic current such that the stack can be de-scaled of inorganic matter, and that is configured to operate at a relatively high recovery ratio.

The CDE plant generates energy from two ionic solutions that differ only in the concentration of the solute dissolved therein; the two ionic solutions have different amounts of chemical energy. This difference in chemical energy is the "concentration difference energy" that exists between the two solutions. For example, when equal volumes of solutions of saltwater and freshwater are placed in adjacent chambers and are separated from each other solely by a membrane that is water, but not ion, permeable, the concentration difference energy causes water from the freshwater container to flow into the saltwater container.

Similarly, when equal volumes of solutions of saltwater and freshwater are placed in adjacent chambers and are separated from each other solely by a membrane that is ion, but not water, permeable, the concentration difference energy results in a voltage difference between the two chambers. A membrane that is ion, but not water, permeable is hereinafter referred to as an "ion exchange membrane". Ion exchange membranes include "cation exchange membranes" and "anion exchange membranes". Cation and anion exchange membranes are those membranes that allow primarily cations (positively charged ions) and anions (negatively charged ions) to pass there through, respectively. Exemplary cation exchange membranes include Neosepta™ CMX, CM-1; Ralex™ CMH-PES; Fumasep™ FKE, FKD; and Selemion™ CMV membranes. Exemplary anion exchange membranes include Neosepta™ AM-1, AFN, AMX; Ralex™ AMH-PES; Fumasep™ FAD; and Selemion™ DVS, APS membranes.

When saltwater is desalinated, at least some of the cations (primarily $Na^+$) and anions (primarily $Cl^-$) in the saltwater are removed from the saltwater. Removing these ions requires energy. The CDE plant utilizes concentration difference energy to remove cations and anions from the saltwater, thereby desalinating the saltwater.

Referring now to FIG. 1, there is depicted a schematic of one embodiment of a CDE plant 101 that can be used for desalinating saltwater. The plant 101 depicted in FIG. 1 is able to store low grade thermal energy, such as solar energy, in the form of concentrated saltwater; this stored chemical energy is transformed to desalinate saltwater in a dialytic stack 102a as described in more detail below in respect of FIGS. 2 and 3, below. If not solar energy, the low grade thermal energy may be, for example, waste heat (such as from a power plant) having a temperature of about 25 to 80 degrees Celsius, as described in respect of FIG. 6, below. Concentrated saltwater used to operate the plant 101 can be produced by evaporating water from saltwater to the atmosphere. Notably, areas that are dry and arid and consequently likely to require desalination technology are also those areas that tend to have less humid atmospheres and receive a great deal of solar radiation, and therefore have environments in which water readily evaporates to atmosphere. Consequently, areas in which the plant 101 is likely to function best are those areas in which the plant 101 is needed most.

Central to the plant 101 is the dialytic stack 102a. Shown fluidly coupled to the stack 102a are four reservoirs: a concentrate reservoir 132, a product feed reservoir 108, a diluent-p reservoir 110, and a diluent-c reservoir 116. The concentrate reservoir 132 holds a concentrated ionic solution ("concentrate"); the product feed reservoir 108 holds the product feed, which is the ionic solution to be desalinated; the diluent-p reservoir 110 holds a third ionic solution ("diluent-p"); and the diluent-c reservoir holds a fourth ionic solution ("diluent-c"). Not shown in FIG. 1 but also fluidly coupled to the stack 102a is an electrolyte reservoir containing electrolyte solution. Each of the five solutions plays a role in the desalination process, as described in further detail below. Fluidly coupled to each of the product feed and diluent-p reservoirs 108, 110 via a pre-treatment system 106 is a saltwater reservoir 104. The saltwater reservoir 104 may be the ocean or any other brackish water supply. Other suitable brackish water supplies include brine discharge from a conventional desalination plant such as a RO plant, as described in more detail with reference to FIG. 6, below. The pre-treatment system 106 treats the saltwater prior to using it for desalination. The pre-treatment system 106 is designed to remove debris, suspended solids and organic and inorganic matter that can foul or plug equipment used in the plant 101. Exemplary pre-treatment systems may include straining, coagulation, flocculation, sedimentation, dissolved air flotation, granular media filtration, slow sand filtration, rapid sand filtration, and membrane filtration such as ultrafiltration or microfiltration.

In the present embodiment, the concentrate has a higher ionic concentration than the diluent-c, the diluent-c has a higher ionic concentration than the diluent-p, and the diluent-p has an ionic concentration that is equal to or higher than that of the product feed. The concentrate, diluent-c, diluent-p, product feed and electrolyte are pumped from their respective reservoirs through the dialytic stack 102a when the product feed is being desalinated. Consequently, the dialytic stack 102a is a "five stream" stack.

In FIG. 1, each of the concentrate, diluent-c, and diluent-p are pumped from the concentrate reservoir 132, diluent-c reservoir 116, and diluent-p reservoir 110, respectively, through the dialytic stack 102a, and are at least partially returned to the reservoir from which they were pumped prior to being again pumped through the dialytic stack 102a. The paths travelled by each of the concentrate, diluent-c, and diluent-p from their respective reservoirs, through the dialytic stack 102a, and back to their respective reservoirs are hereinafter referred to as the "concentrate circuit", "diluent-c circuit", and "diluent-p circuit", respectively.

The plant 101 of FIG. 1 depicts only one dialytic stack; however, in alternative embodiments more than one dialytic stack is used, and desalination of the product feed occurs gradually over multiple desalination stages. For example, in one alternative embodiment in which multiple dialytic stacks are employed, the product feed is passed through the multiple stacks in series, while the concentrate, diluent-c, diluent-p, and electrolyte are passed through the dialytic stacks in parallel.

Following desalination in the stack 102a, the product feed becomes "product" having a reduced salt concentration relative to the product feed. Fluidly coupled to the stack 102a is a post-treatment system 146 that accepts the product and treats it as is known to persons skilled in the art, such as by using one or more of chlorination, ozonation, and ultra-violet treatment. Following treatment in the post-treatment system 146, the product is stored in a storage reservoir 148.

The concentration of the concentrate flowing through the stack 102a is lowered while in the stack 102a as a result of the product feed being desalinated, while the concentration of each of the diluent-c and diluent-p is increased while in the stack 102a as a result of desalination of the product feed. After passing through the stack 102a a portion of the diluent-p is diverted to the diluent-c reservoir 116 via valve 112 with the remainder returning to the diluent-p reservoir 110. Pretreated saltwater from pre-treatment system 106 is sent to the diluent-p reservoir 110 through a control valve 107 to replace lost diluent and to decrease the concentration of the diluent-p.

The volume and concentration of the diluent-p stored in the diluent-p reservoir 110 are maintained by combined operation of control valves 107 and 112. Control valve 107 is fluidly coupled between the pre-treatment system 106 and the diluent-p reservoir 110, while control valve 112 is fluidly coupled between the exit of the stack 102a and the diluent-p reservoir 110. The volume of saltwater that enters the diluent-p reservoir 110 from the saltwater reservoir 104 is directly proportional to the degree to which control valve 107 is opened; the volume of diluent-p that is returned to the diluent-p reservoir 110 after passing through the stack 102a is directly proportional to the degree to which control valve 112 is opened. Any diluent-p not returned to the diluent-p reservoir 110 is instead returned to the diluent-c reservoir 116.

If the concentration of the diluent-p reservoir 110 increases above a diluent-p concentration threshold, for example 3.7% salt mass, valve 107's opening is increased to divert more lower concentration saltwater from the saltwater reservoir 104 to the diluent-p reservoir 110 while valve 112's opening is decreased to divert the diluent-p to the diluent-c reservoir 116, thereby lowering the concentration of the diluent-p in the diluent-p reservoir 110. If the volume of the diluent-p in the reservoir 110 increases above a maximum diluent-p volume threshold, for example 80% of the total volume of the diluent-p reservoir 110, valve 112's opening is further decreased to divert the diluent-p to the diluent-c reservoir 116, and then valve 107's opening is also decreased to reduce saltwater flow into the diluent-p reservoir 110, if required. If the volume of the diluent-p in the diluent-p reservoir 110 decreases below a minimum diluent-p volume threshold, for example 20% of the volume of the diluent-p reservoir 110, valve 107's opening is further increased to divert more saltwater from the saltwater reservoir 104 to the diluent-p reservoir 110, and then valve 112's opening is further increased to allow more used diluent-p to be recirculated to the diluent-p reservoir 110, as desired.

The diluent-c in the diluent-c reservoir 116 is typically maintained at a higher concentration than the diluent-p in the diluent-p reservoir 110; the concentration and volume of the diluent-c in the diluent-c reservoir 116 is maintained by operation of valves 118 and 112. If the concentration of the diluent-c in the diluent-c reservoir 116 increases above a diluent-c concentration threshold, for example 4.2% salt mass, valve 112's opening is decreased to divert lower concentration diluent-p to the diluent-c reservoir 116 while valve 118's opening is also decreased to discharge more diluent-c being output from the dialytic stack 102a to the saltwater reservoir 104, through a back-flow preventer 122, thereby lowering the concentration of the diluent-c. If the volume of the diluent-c in the diluent-c reservoir 116 increases above a maximum diluent-c volume threshold, for example 80% of the volume of the diluent-c reservoir, valve 118's opening is further decreased to discharge the diluent-c output from the stack 102a to the saltwater reservoir 104 through the back-flow preventer 122. If the volume of the diluent-c in the diluent-c reservoir 116 decreases below a minimum diluent-c volume threshold, for example 20% of the volume of the diluent-c reservoir 116, valve 118's opening is increased to reduce discharge of diluent-c to the saltwater reservoir 104. Optionally, the control system for the control valves 107, 112, 118 and reservoirs 110 and 116 includes alarms and shut-down protection settings to prevent operation of the plant 101 outside of the foregoing concentration and volumetric thresholds.

In the present embodiment, mixing of the diluent-p and diluent-c occurs in the diluent-c reservoir 116. However, in alternative embodiments mixing does not occur in any reservoir, but can occur in any suitable mixer as is known to skilled persons. For example, in lieu of mixing the diluent-p and diluent-c in the diluent-c reservoir 116, the diluent-p and diluent-c could flow through separate pipes that meet at a T-junction, where mixing occurs.

The concentration of the concentrate in the concentrate reservoir 132 is maintained by diverting a portion of the diluent-c exiting the stack 102a to a reconcentrator 126 that removes water from the diluent-c to generate the concentrate. The reconcentrator 126 forms part of the concentrate circuit. The reconcentrator 126 evaporates water to air and thereby increases the concentration of a solution until the solution is above a concentrate concentration threshold. A pump 128 circulates the solution in the reconcentrator to promote even and efficient evaporation of water to air. The heat of vaporization lost in the reconcentrator is replaced from a heat source such as solar energy or waste heat from a nearby process plant. Exemplary reconcentrators 126 may include, but not be limited to, evaporative ponds, evaporative spray ponds, natural draft evaporative towers, and forced draft evaporative towers, all of which may have solution storage capability incorporated into their catchments. In the plant 101, the reconcentrator 126 is fluidly coupled to the concentrator reservoir 132 and to the stack 102a such that it can both increase the concentration of diluent-c that has been used in the stack 102a, and maintain the concentration of the concentrate within the concentrate reservoir 132 itself.

FIG. 1 depicts batch operation of the reconcentrator 126 that reduces mixing energy losses and therefore improves overall energy efficiency of the plant 101. Evaporation rates are higher for solutions of lower concentration due to their higher vapor pressure. Therefore, it is more energy efficient to evaporate water from the diluent-c, which is at a lower concentration than the concentrate, until the diluent-c matches the concentration of the concentrate before mixing the diluent-c and the concentrate in the concentrate reservoir 132. This can be achieved in batch mode with one reconcentrator through incorporation of solution storage into a reconcentrator catchment and operation flow control valves 124, 130, 138, and 142 as follows. First, valves 130, 138, and 142 are closed and valve 124 is opened to fill the reconcentrator 126 catchment with a volume of diluent-c that contains a specified mass of salt ions that are to be replaced in the concentrate. When the concentration of the diluent-c in the reconcentrator 126 catchment reaches the concentration of the concentrate in the concentrate reservoir 132, valves 130 and 138 are opened and valves 124 and 142 are closed. Valve 138 is opened to divert the concentrate exiting the stack 102a to the reconcentrator 126 for evaporation prior to being returned to the concentrate reservoir 132. The reconcentrator 126 is operated to remove the volume of water attributed to the diluent-c, thus maintaining the overall concentration of the solution in the concentrate circuit. When the concentrate reaches a maximum allowable concentration limit, which will be less than the saturation limit of the input water at the plant operating temperature, the reconcentrator 126 is stopped. The concentrate can be diverted from the reconcentrator 126 to the concentrate reservoir 132 by opening the valve 130; diversion may be facilitated by pumping (not shown). Optionally, the volume and concentration of solution in the concentrate circuit can be adjusted by opening valve 142 and diverting portions of the concentrate in the concentrate reservoir 132 to the reconcentrator 126.

In an alternative embodiment (not depicted), multiple reconcentrators can be used in lieu of the reconcentrator 126 depicted in FIG. 1. The multiple reconcentrators are fluidly coupled in series immediately prior to valve 130; the concentration of the solutions in the reconcentrators 126 increases as proximity to valve 130 decreases. For example, when a first and second reconcentrator are fluidly coupled in series with the first reconcentrator fluidly farther from valve 130 than the second reconcentrator, the first reconcentrator increases the concentration of the diluent-c that is input to it through valve 138. The first reconcentrator then outputs the diluent-c solution to the second reconcentrator, which further increases the concentration of the diluent-c until it reaches the concentration of the concentrate and which then outputs the diluent-c to the concentrate reservoir 132.

When at least two reconcentrators are used, the plant 101 can be operated in continuous flow mode with the first reconcentrator receiving diluent-c and increasing its concentration to match that of the concentrate and then sending the diluent-c to a second reconcentrator that maintains the concentration of the concentrate in the concentrate reservoir 132.

The operation of the plant 101 depicted in FIG. 1 and described above maintains the concentrations and volumes of the concentrate, diluent-c, and diluent-p circuits. A plant designer can adjust the relative flow rates to decrease the volume of saltwater input to the plant 101 and increase the concentration of saltwater discharged from the plant 101, thereby increasing the recovery ratio of the plant 101. This can be achieved by reducing the flow rate of the diluent-c exiting the plant 101, thereby increasing the concentration of the diluent-c in the diluent-c reservoir 116. This allows the plant 101 to intake less saltwater; as a result, a relatively small capacity pre-treatment system 106 is required but a higher concentration saltwater discharge is produced. Beneficially, designers can balance the size of intakes and pre-treatment systems with the concentration of saltwater discharge that pertinent environmental regulations allow.

Operating the Dialytic Stack in "Forward Polarity"

Figure 2:
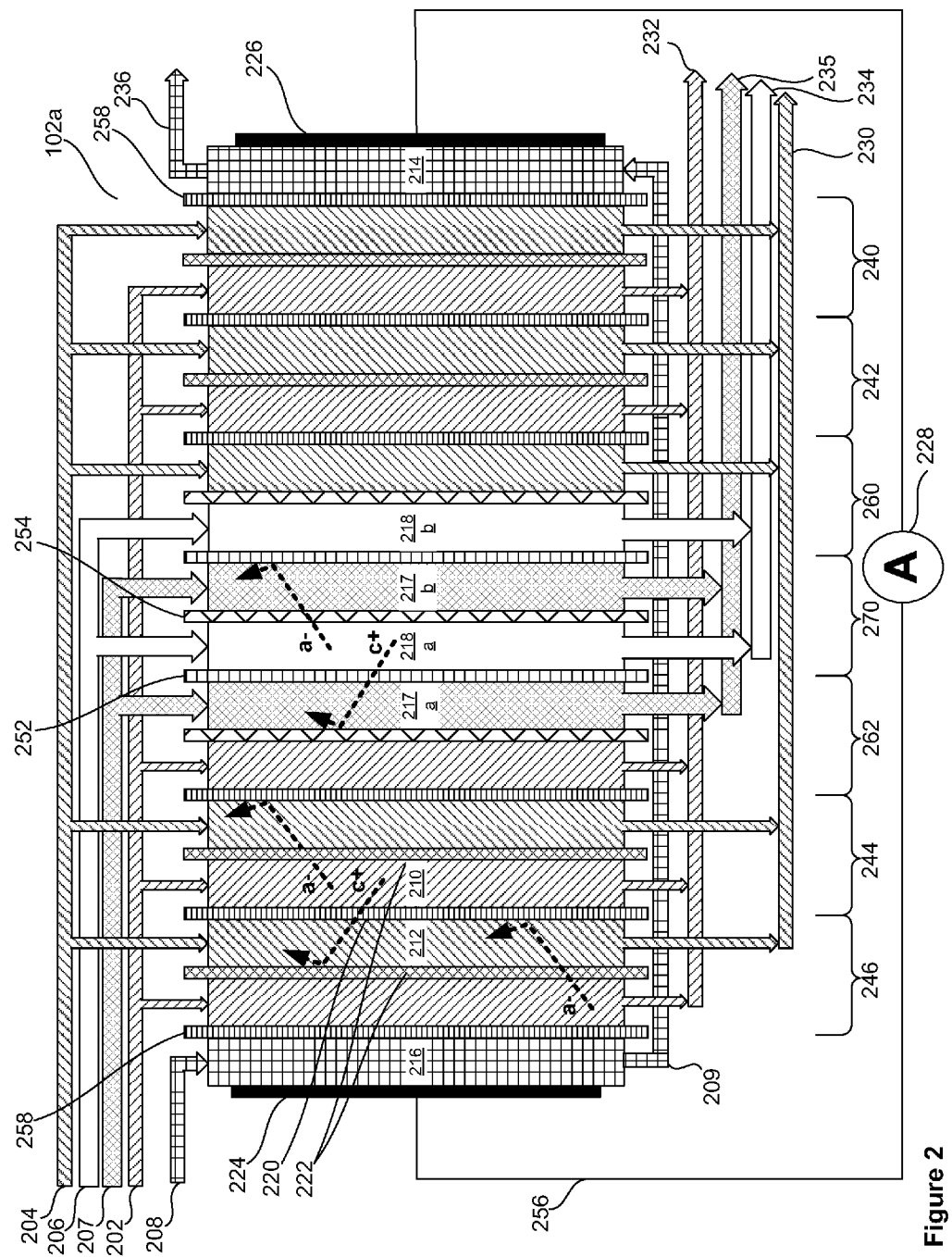
FIG. 2 is a schematic view of one embodiment of a dialytic stack that utilizes concentration difference energy to desalinate saltwater, operating in a forward polarity.

Referring now to FIG. 2, there is depicted a schematic view of a dialytic stack 102a for desalinating saltwater that is being operated in a forward polarity. The dialytic stack 102a is composed of a series of alternating concentrate and diluent-c chambers 210 and 212. The concentrate and diluent-c chambers 210, 212 are disposed around a series of alternating diluent-p and product chambers 217a,b and 218a,b. Product chamber 218a is hereinafter referred to as a "first product chamber" while product chamber 218b is hereinafter referred to as a "second product chamber". Flowing through each of the diluent-p chambers 217a,b is the diluent-p and flowing through each of the product chambers 218a,b is the product feed. The product feed may be seawater having a salt concentration of about 3.5% by mass. The diluent-p may be saltwater, produced from seawater, with an equal or higher salt concentration than the product feed; for example, the salt concentration of the diluent-p may be about 3.5% to 4.2% by mass. The diluent-c and the concentrate may be higher concentration saltwater having a salt concentration of about 3.7% to 6.5% and 15% to 28% by mass, respectively. The salt concentration of the concentrate can be as high as the solubility limit of salt in water.

The diluent-c enters and exits the diluent-c chambers 212 via diluent-c supply and exit conduits 204 and 230. Concentrate may enter and exit the concentrate chambers 210 via concentrate supply and exit conduits 202 and 232. Adjacent diluent-c and concentrate chambers 212, 210 are separated from each other by a first type of cation or anion exchange membrane 220 and 222; the cation exchange membrane 220 is hereinafter referred to as a "diluent-c/concentrate cation exchange membrane" 220, the anion exchange membrane 222 is hereinafter referred to as a "diluent-c/concentrate anion exchange membrane" 222, and the membranes 220, 222 are collectively referred to as "diluent-c/concentrate ion exchange membranes". Each of the diluent-c/concentrate ion exchange membranes forms a shared boundary between and is in ionic communication with the diluent-c and concentrate chambers 212, 210 such that ions flow from the concentrate to the diluent-c while the product feed is being desalinated.

The diluent-p may enter and exit the diluent-p chambers 217a,b via diluent-p supply and exit conduits 207 and 235. The product feed may enter and exit the product chambers 218a,b via product feed supply and exit conduits 206 and 234. Adjacent diluent-p chambers 217a,b and product chambers 218a,b are separated from each other by a second type of cation or anion exchange membrane 252 and 254; the cation exchange membrane 252 is hereinafter referred to as a "product chamber cation exchange membrane" 252, the anion exchange membrane 254 is hereinafter referred to as a "product chamber anion exchange membrane" 254, and the membranes 252, 254 are collectively hereinafter referred to as "product chamber ion exchange membranes". Each of the product chamber ion exchange membranes forms a shared boundary between and is in ionic communication with the diluent-p chambers 217a,b and product chambers 218a,b such that ions flow from the product feed to the diluent-p while the product feed is being desalinated. With respect to the first product chamber 218a, the diluent-p chamber 217a acts as a cation discharge chamber and the diluent-p chamber 217b acts as an anion discharge chamber. With respect to the second product chamber 218b, the diluent-p chamber 217b acts as a cation discharge chamber while the diluent-c chamber 212 that is adjacent to the second product chamber 218b acts as an anion discharge chamber. The diluent-p flowing through each of the diluent-p chambers 217a,b and the diluent-c flowing through the diluent-c chamber 212 adjacent to the second product chamber 218b are each discharge solutions.

In the embodiment depicted in FIG. 2, each pair of chambers 240, 242, 244, 246, 262 constitutes a drive cell ("drive cell"). Each of the drive cells 240, 242, 244, 246 is composed of one of the diluent-c chambers 212 and one of the concentrate chambers 210. The diluent-c chamber 212 and concentrate chamber 210 are separated from each other by and are in ionic communication with one of the diluent-c/concentrate anion exchange membranes 222. The concentration difference energy that exists between the concentrate and diluent-c results in the drive cell generating a voltage ("drive voltage"). In an embodiment wherein the concentrate is about 20% aqueous sodium chloride by mass and the diluent-c is about 5.5% aqueous sodium chloride by mass, the theoretical drive voltage for each drive cell is about 0.04 Volts. The drive cell 262 is composed of the diluent-p chamber 217a and one of the concentrate chambers 210. The diluent-p chamber 217a is bounded on one side by and is in ionic communication with one of the product chamber anion exchange membranes 254 and is bounded on another side by and is in ionic communication with one of the diluent-c/concentrate cation exchange membranes 220. In the drive cell 262 anions migrate from the concentrate chamber 210, through the product chamber anion exchange membrane 254, and into the diluent-p chamber 217a. Similarly, cations migrate from the product chamber 218, through the product chamber cation exchange membrane 252, and into the diluent-p chamber 217a. In an embodiment wherein the concentrate is about 20% aqueous sodium chloride by mass and the diluent-p is about 3.7% aqueous sodium chloride by mass, the theoretical voltage that the second boundary cell generates is about 0.042 Volts.

Each of the drive cells is separated from an adjacent drive cell by one of the diluent-c/concentrate cation exchange membranes 220. The diluent-c/concentrate ion exchange membranes 220, 222 allow ions to flow from the concentrate to the diluent chambers, and therefore the drive cells 240, 242, 244, 246, 262 are in series ionic communication with each other when the product feed is being desalinated. The drive voltage generated by a group of drive cells in series ionic communication with each other is equal to the sum of the voltages produced by each of the drive cells in the series. Consequently, the total drive voltage produced by the drive cells 240, 242, 244, 246, 262 is about 0.202 Volts.

The dialytic stack 102a also contains a first desalination cell 270, which is composed of one of the diluent-p chambers 217b and the first product chamber 218a. The first product chamber 218a is bounded on one side by and is in ionic communication with one of the product chamber anion exchange membranes 254 and is bounded on another side by and is in ionic communication with one of the product chamber cation exchange membranes 252. Adjacent to the first desalination cell 270 is a second desalination cell 260, which is composed of the second product chamber 218b and one of the diluent-c chambers 212. The second product chamber 218b is bounded on one side by and is in ionic communication with one of the product chamber anion exchange membranes 254 and is bounded on another side by and is in ionic communication with one of the diluent-c/concentrate cation exchange membranes 220.

Flowing through the product chambers 218a,b is the product feed. Typically, the salt concentration of the product feed as it enters the dialytic stack 102a is less than or equal to the concentrations of the solutions in the chambers adjacent to the product chamber 218a,b. In order to desalinate the product feed, a certain voltage ("desalination voltage") has to be applied across each of the product chambers 218a,b. In the illustrated embodiment, in order to desalinate the product feed to a concentration of about 0.04% salt by mass such that anions and cations are driven from the first product chamber 218a into adjacent diluent-p chambers 217a,b containing diluent-p of about 3.5% salt by mass, the desalination voltage is approximately −0.088 Volts. In order to similarly desalinate the product flowing through the second product chamber 218b when the diluent-c is about 5.5% aqueous sodium chloride by mass the desalination voltage is about −0.092 Volts. As mentioned above, in respect of the first product chamber 218a the diluent-p chamber 217a acts as a cation discharge chamber into which cations from the first product chamber 218a migrate and the diluent-chamber 217b acts as an anion discharge chamber into which anions from the first product chamber 218a migrate during desalination. In respect of the second product chamber 218b, the diluent-p chamber 217b acts as a cation discharge chamber and diluent-c chamber 212 adjacent to the second product chamber 218b acts as an anion discharge chamber.

When a sufficient voltage greater than the sum of the desalination voltages of the product chambers 218a,b is applied across the product chambers 218a,b, anions migrate towards one electrode, an anode 226, and cations migrate towards another electrode, a cathode 224. In the first desalination cell 270 anions migrate from the first product chamber 218a, through the product chamber anion exchange membrane 254, and into the diluent-p chamber 217b. Similarly, cations migrate from the product chamber 218a, through the product chamber cation exchange membrane 252, and into the diluent-p chamber 217a. In the second desalination cell 260 anions migrate from the second product chamber 218b, through the product chamber anion exchange membrane 254, and into the diluent-c chamber 212. Similarly, cations migrate from the product chamber 218b, through the product chamber cation exchange membrane 252, and into the diluent-p chamber 217b.

In the illustrated embodiment, the net voltage of the dialytic stack 102a excluding the anode and cathode electrolyte chambers 214 and 216 is 0.022 Volts, which is the sum of (a) through (d), listed below:

0.16 Volts for all of the drive cells 240, 242, 244, 246
0.042 Volts for the drive cell 262
−0.088 Volts for the first desalination cell 270
−0.092 Volts for the second desalination cell 260
0.022 Volts net dialytic stack voltage excluding anode and cathode electrolyte chambers 214 and 216

As the net dialytic voltage is positive 0.022 Volts the arrangement of membranes allows cation migration towards cathode 224 and anion migration in an opposite direction towards anode 226, and the product feed in the product chambers 218a,b is desalinated.

In FIG. 2, when the product feed is being desalinated, an ionic current flows through the chambers of the stack 102a. For example, anions and cations migrate from the first product chamber 218a and into the adjacent diluent-p chambers 217a,b. Similarly, anions and cations migrate from the concentrate chamber 210 of the drive cell 262 and into the adjacent diluent-p chamber 217a and diluent-c chamber 212. Ions analogously migrate out of the second product chamber 218b and out of the concentrate chambers 210 of the other drive cells 240, 242, 244, 246. This simultaneous ionic migration causes an ionic current to flow through the chambers of the stack 102a, such that anions steadily migrate towards the anode 226 and cations steadily migrate towards the cathode 224 so long as the product feed is being desalinated. By being in the path of the ionic current, the product chambers 217a,b are in ionic communication not only with the discharge chambers adjacent to the product chambers 217a,b, but also with the other drive cells 240, 242, 244, 246 in the stack 102a.

In FIG. 2, the ionic circuit is completed electrochemically. Electrochemical completion of the ionic circuit is achieved by disposing anode and cathode electrolyte chambers 214 and 216, between the stack of diluent-c and concentrate chambers 212, 210 and the anode 226 and cathode 224, respectively. The electrolyte chambers are bounded by ion exchange membranes 258, which in this embodiment are the same as diluent-c/concentrate cation exchange membranes 220. A suitable electrolyte flows into and out of the electrolyte conduits via electrolyte supply conduits 208 and electrolyte exit conduits 236, respectively. Oxidation reactions (at the anode 226) and reduction reactions (at the cathode 224) convert the ionic current that passes through the dialytic stack into electric current thereby completing the ionic circuit. An exemplary suitable electrolyte is $Na_3Fe(CN)_6$ (aq) and $Na_4Fe(CN)_6$ (aq) in bulk of NaCl (aq). Additional ionic circuit completion methods involve circulating an ionic solution between the ends of the dialytic stack, or forming the stack into a ring.

The anode 226 and the cathode 224 are electrically communicative via an electrical conduit 256, thereby resulting in electrons flowing from the anode 226 to the cathode 224. The ionic circuit can be measured by an ammeter and used to diagnose the performance of dialytic stacks, for example determining when the stack polarity needs to be reversed to de-scale membranes as measured by a deterioration in the ionic current, or informing the operator of an internal leak or membrane burst as measured by a sudden step change in the ionic current. If the net dialytic stack voltage is negative an external voltage can be used to effect desalination. The external voltage can be supplied by a voltage source, which is electrically coupled to the electrical conduit 256. Alternatively, instead of utilizing the voltage source 228 to supply any additional voltage, additional drive cells may be added to the dialytic stack 102a until a sufficient positive net dialytic stack voltage is achieved such that stack 102a may also act as a power source. In such an embodiment, an electrical load can be powered by electrically coupling it between the anode 226 and cathode 224.

The diluent-c/concentrate cation and anion ion exchange membranes 220 and 222 can be the same as, or different than, the product chamber cation and anion exchange membranes 252 and 254. In one embodiment, the diluent-c/concentrate ion exchange membranes are less ionically selective and therefore have a lower resistance than the product chamber ion exchange membranes. Generally, ion exchange membranes that have a lower resistance are more conductive and tend to be less selective and have a higher water content, resulting in increased chance of back diffusion and water transport. The diluent-c/concentrate ion exchange membranes may have specific properties, such as higher water content, low ionic resistance and low ionic selectivity for ionic species, enabling strong ionic migration of these species from the concentrate chambers 210 to adjacent diluent-c or diluent-p chambers 212, 217. Because the diluent-c/concentrate ion exchange membranes do not bound the product chambers 218a,b where product is being produced, they can be less ionically selective and therefore allow some back diffusion and higher water transport than the product chamber ion exchange membranes. Back diffusion of ions and water transport across the diluent-c/concentrate ion exchange membranes 220, 222 is less of a concern than it is for the product chamber ion exchange membranes 252, 254 because the solutions will not be used as desalinated product and some mixing of ionic species and water transport between the diluent-c and concentrate can be tolerated. The diluent-c/concentrate ion exchange membranes 220, 222 outnumber the product chamber ion exchange membranes 252, 254 and can be manufactured to have a lower resistance than the product chamber ion exchange membranes 252, 254, and therefore enable a stronger ionic current to flow through the stack 102a at the cost of some back diffusion and water transport in the drive cells. Exemplary diluent-c/concentrate cation and anion exchange membranes with low resistance and low selectivity for larger ionic species could include Neosepta CM-1 and AFN, respectively, or Fumasep FKD and FAD, respectively.

It can be beneficial to use product chamber ion exchange membranes 252, 254 with higher selectivity for all ionic species present in the saltwater reservoir 104 when compared to the diluent-c/concentrate ion exchange membranes 220, 222. This is beneficial since the product feed should not be polluted through back diffusion of ions from the adjacent anion and cation discharge chambers while water transport of product feed into the anion and cation discharge chambers should be limited. Generally, higher selectivity membranes will have a lower water content and higher resistance. This will slow ionic current in the dialytic stack but will help to prevent back diffusion and water transport, subsequently maintaining purity of the product solution being desalinated. Exemplary product chamber cation and anion exchange membranes with higher selectivity could include Neosepta CMX and AFX.

As membrane selectivity for all ions is not perfectly equivalent, certain ionic species may accumulate in the concentrate circuit, or more specifically in the concentrate reservoir 132, as they may not be transferred as readily through the diluent-c/concentrate ion exchange membranes. Consequently, periodic "blow down" or flushing of the concentrate from the stack 102a can be performed. The release can optionally be captured and further evaporated to harvest useful salt products for sale.

Beneficially, the polarity of the dialytic stack 102a can be periodically reversed to de-scale the membranes and electrodes, as described with reference to FIG. 3.

Operating the Dialytic Stack in "Reverse Polarity"

Figure 3:
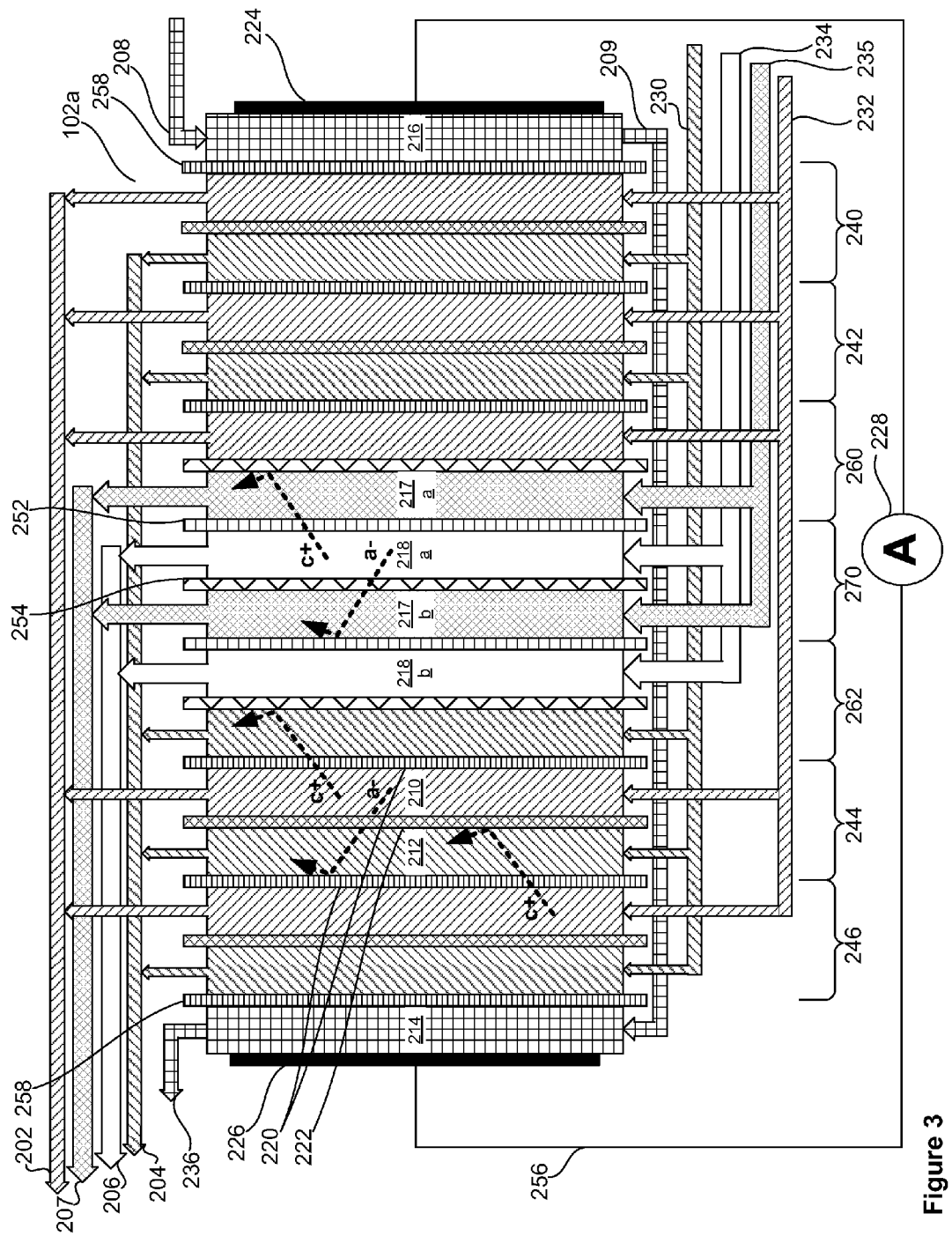
FIG. 3 is a schematic view of the embodiment of the dialytic stack depicted in FIG. 2 operating in a reverse polarity.

Referring now to FIG. 3, there is depicted a method of using the dialytic stack 102a such that it has a polarity opposite the dialytic stack 102a as used as depicted in FIG. 2. Using the stack 102a as shown in FIG. 3 is similar to using the stack 102a as shown in FIG. 2, with the exceptions being the concentrate, diluent-p, diluent-c, product feed, and electrolytes flow in a direction countercurrent to that depicted in FIG. 2 and that:

the chambers used as product chambers 218 in FIG. 3 act as the diluent-p chambers 217 in FIG. 2;

the chambers used as diluent-p chambers 217 in FIG. 3 act as the product chambers 218 in FIG. 2;

the chambers used as diluent-c chambers 212 in FIG. 3 act as the concentrate chambers 210 in FIG. 2; and the chambers used as the concentrate chambers 210 in FIG. 3 act as the diluent-c chambers 212 in FIG. 2.

Changing the direction in which the various solutions flow through the stack 102a can help to flush debris or saturated salts that may have built-up within the stack 102a, but is not required to reverse the polarity of the drive voltage of the stack 102a. Reversing the polarity of the drive voltage consequently changes the direction of ion migration, which results in de-scaling of the ion exchange membranes and electrodes of any build-up created during operation in forward polarity. Changing concentration of the solutions flowing through the chambers of the stack 102a, and in particular replacing the concentrate with the diluent-c, facilitates dissolving of salts that may have formed. Notably, reversing the polarity of the drive voltage can be performed without changing the direction of flow of solutions through the stack 102a; that is, even when the direction of flow of solutions through the stack 102a is as depicted in FIG. 2, drive voltage may be reversed by changing the type of fluid that flows through each of the chambers of the stack 102a, as described above.

Beneficially, as is evident from examining FIGS. 2 and 3, the polarity of the stack 102a can be easily reversed simply by swapping the contents of the diluent-c and concentrate chambers 212, 210 and of the diluent-p and product chambers 217a,b, 218a,b. As each of the chambers in the stack 102a is used only to hold either diluent-c and concentrate or product feed and diluent-p, one set of hydraulic pumps can be used to pump solution through the diluent-p chambers 217a,b of FIG. 2, another set of hydraulic pumps can be used to pump solution through the product chambers 218a,b of FIG. 2, and a third set of hydraulic pumps can be used to pump solution through the concentrate and diluent-c chambers 210, 212. As the hydraulic pumps pump fluid through the same number of compartments regardless of whether the stack 102a is operating in forward or reverse polarity, the stack 102a is hydraulically balanced and the same pumps can be used to pump solution through the stack 102a at a constant velocity regardless of which polarity the stack 102a is operating. If the stack 102a were not hydraulically balanced, to maintain constant solution velocity at a constant pressure in both forward and reverse polarities either variable speed pumps could be used to pump solutions through the stack 102a or valving external to the stack could be used to swap the solutions flowing through the pumps in accordance with the swapping of solutions performed when polarity in the stack 102a is reversed. However, these solutions are more costly and cumbersome than simply utilizing the hydraulically balanced stack 102a.

Stack Assembly

Referring now to FIGS. 4(a)-(c), three views of the dialytic stack 102a operable in forward and reverse polarities are depicted. FIG. 4(a) is a sectional view lengthwise through the stack 102a; FIG. 4(b) is an exploded view of the stack 102a; and FIG. 4(c) is a detailed view of a gasket used in the stack 102a.

Each of the chambers used in the stack 102a are delineated by one type of gasket 410, 412, 417 and 418, in accordance with Table 1 below:

TABLE 1

Summary of Gaskets Used in the Stack 102a and the Chambers the Gaskets Delineate

| Figure Label | Gasket Name | Forward Polarity Chamber Type | Reverse Polarity Chamber Type |
| --- | --- | --- | --- |
| 410 | C/D-c | Concentrate | Diluent-c |
| 412 | D-c/C | Diluent-c | Concentrate |
| 418 | P/D-p | Product | Diluent-p |
| 417 | D-p/P | Diluent-p | Product |

The gaskets 410, 412, 417, 418 and membranes 220, 222, 252, 254 are compressed between end plates 402 and 404. Holes 423 are for stack assembly bolts (not shown), which pass laterally through the stack and compress all gaskets and membranes between the end plates 402 and 404. The gaskets 410, 412, 417 and 418 provide two functions: first, within the gaskets is a spacer in the form of a separating mesh 420 that provides a space between the membranes 220, 222, 252, 254 to allow solution to pass through the chamber delineated by the gaskets 410, 412, 417, 418 while simultaneously preventing the membranes on either side of the chamber from touching; second, within the gaskets are formed solution distribution manifolds 421 used to feed solutions to each of the chambers. Referring now to FIG. 4(c), there is depicted the D-c/C gasket 412, which forms one of the diluent-c chambers 212 when the stack 102a is operated in forward polarity. The manifolds 421 are formed in the gasket 412 from holes 422, 424, 426, 428, 430 and 432, which act as conduits that maintain separation of the concentrate, diluent-c, diluent-p, and product feed solutions when assembled into the stack 102a. A notch 434 functions as an inlet for solution to enter the chamber when the stack 102a is operated in forward polarity and an outlet for solution to exit the chamber when the stack 102a is operated in reverse polarity; similarly, a notch 436 functions as an inlet when the stack 102a operates in forward polarity and an outlet when the stack 102a operates in reverse polarity.

The various notches and holes in the gasket 412 are described in Table 2:

TABLE 2

Summary of Notches and Holes Used in Exemplary D-c/C Gasket 412

| Item | Forward Polarity | Reverse Polarity |
| --- | --- | --- |
| 434 | Diluent-c chamber inlet notches | Concentrate chamber outlet notches |
| 436 | Diluent-c chamber outlet notches | Concentrate chamber inlet notches |
| 430 | Concentrate outlet manifold holes | Diluent-c outlet manifold holes |
| 432 | Concentrate inlet manifold holes | Diluent-c inlet manifold holes |
| 426 | Diluent-p inlet manifold holes | Product feed outlet manifold holes |
| 424 | Product feed outlet manifold holes | Diluent-p inlet manifold holes |
| 422 | Diluent-p outlet manifold holes | Product feed inlet manifold holes |
| 428 | Product feed inlet manifold holes | Diluent-p outlet manifold holes |

The general arrangement of the gaskets 410, 412, 417, 418 and the membranes 220, 222, 252, 254 can be extended to construct larger stacks with more chambers. The number of drive cells and desalination cells can be adjusted to effect more, or less, desalination of the product feed by respectively increasing or decreasing the drive voltage.

In an alternative embodiment (not depicted), the dialytic stack 102a can be constructed such that desalination occurs in multiple stages. For example, the manifolds 421 can be constructed such that the product feed and diluent-p flow in series through the multiple stages while the product flows in parallel through the multiple stages. Having multiple product chambers desalinate saltwater in parallel increases the total volume of product that can be generated. The output of the initial stage product chambers is directed into a plurality of product chambers in a subsequent stage. Incorporating multiple desalination stages into a single stack results in lower capital costs compared to an arrangement in which a separate stack is used for each desalination stage as fewer electrodes and end plates are used.

Mixing of the concentrate, diluent-c, diluent-p, product feed, or electrolyte solutions internal to the stack 102a is problematic. Mixing could occur if any one of the solutions seeped around or through any of the gaskets. The risk of seepage and mixing can be lowered by manufacturing and operating the stack 102a as described below.

After fabricating the dialytic stack 102a, the quality of the gasket seal between any two of the chambers can be tested by circulating fluids containing differently colored dyes through each circuit feeding respective chambers. Leaks can be detected by observing a change in color of the dyed fluids. If primary color dyes are used both the source and sink of the leak can be deduced from the resulting color mixing or color shifts. Chemical species and other dyes, not limited to but including fluorescent dyes, can be used and output solution species measured to determine the extent of seepage and quality of stack fabrication.

While operating the stack 102a, problems associated with seepage can be monitored and mitigated by measuring the pressures in each circuit input to the stack 102a, and then adjusting the pressures in each circuit by controlling either pump speed, a pressure control valve, a pressure relief valve, or tank head pressure, for example. To prevent pollution of the product, in one embodiment the pressure in the product chamber is set to be higher than the pressures in any other chambers to prevent leakage into the product chamber. The electrolyte pressure is set the lowest to prevent leakage of the electrolyte into the other solutions. Exemplary pressures within the stack 102a are outlined below:

Set the product feed pressure ("P_P"), to 100 kPa;
Set the diluent-p pressure ("P_Dp") at a specified differential pressure ("dP_Dp") lower than the product feed pressure: P_Dp=P_P−dP_Dp, where for example dP_Dp=5 kPa;
Set the diluent-c pressure ("P_Dc") at a specified differential pressure ("dP_Dc") lower than the product feed pressure: P_Dc=P_P−dP_Dc, where for example dP_Dc=5 kPa;
Set the concentrate pressure ("P_C") at a specified differential pressure ("dP_C") lower than the product feed pressure: P_C=P_P−dP_C, where for example dP_C=5 kPa;
Set the electrolyte pressure ("P_E") at a specified differential pressure ("dP_E") lower than the minimum of product feed, diluent-p, diluent-c, and concentrate pressure: P_E=minimum of (P_P, P_Dp, P_Dc, P_C)−dP_E, where for example dP_E=5 kPa.

Inlet or outlet pressures to the stack 102a can be measured to achieve the same control. This way, the product feed pressure is maintained higher than all other solution circuits input to the dialytic stack 102a, such that any seepage that does occur within the stack 102a is seepage of the product into other solutions but not seepage of other solutions into the product. In addition, the electrolyte pressure is maintained lower that all other solution circuits input to the dialytic stack 102a such that any seepage that does occur is not of the electrolyte seeping into any of the product, diluent-c, diluent-p or concentrate chambers.

Seepage can be detected by determining if there is a difference between the input and output mass flow rates of each of the solutions as it passes through the stack 102a. For example, any seepage of product feed can be monitored as follows:

measuring product feed input solution flow rate ("F_Pi") and product output solution flow rates ("F_Po") using, for example, a flow meter or change in reservoir volume measurement over time;
measuring product feed input solution salt mass fraction concentration ("X_Pi") and product output solution salt mass fraction concentration ("X_Po");
calculating product input solution density ("d_Pi") and product output solution density ("d_Po") based on either a measured or assumed temperature, the measured salt concentrations, and density formulas disclosed in B. Sparrow, "Empirical equations for the thermodynamic properties of aqueous sodium chloride", *Desalination* 159 (2003) at 161-170, the entirety of which is hereby incorporated by reference herein;
calculating product feed input solution mass flow rate ("m_Pi") and product output solution mass flow rate ("m_Po") as follows: solution mass flow rate=volumetric flow rate*solution density;
calculating the difference between product feed input water volumetric flow rate ("mw_Pi") and product output water volumetric flow rate ("mw_Po") as follows: water mass flow rate=solution mass flow rate*(1−solution salt mass fraction concentration);
calculating the difference between mw_Pi and mw_Po: dmw_P=mw_Pi−mw_Po;
if dmw_P is negative and less than a pre-set limit, for example −0.1% of mw_Pi, solutions are seeping into the product feed. An alarm can be raised and troubleshooting performed to determine the extent, cause, and resolution of the seepage problem; and
if dmw_P is positive and outside a pre-set flow rate threshold, for example 1%, product feed solution is seeping out to other solutions circuits and being lost. An alarm can be raised and troubleshooting performed to determine the extent, cause, and resolution of the seepage problem. The pre-set limit for a positive dmw_P may be greater than the pre-set limit for a negative dmw_P since seepage of product solution out of one of the product chambers 217, 218 is less detrimental than seepage of other solutions into one of the product chambers 217, 218.

Seepage of the electrolyte can be monitored by measuring the volume of the electrolyte reservoir (not shown). If a change in the volume of the electrolyte solution outside a threshold is measured, an alarm can be raised and troubleshooting performed to determine the extent, cause, and resolution of the seepage problem. In addition, the product, diluent-p, diluent-c, and concentrate output from the dialytic stacks can be tested for presence of the electrolyte, either periodically or continuously.

Figure 4:
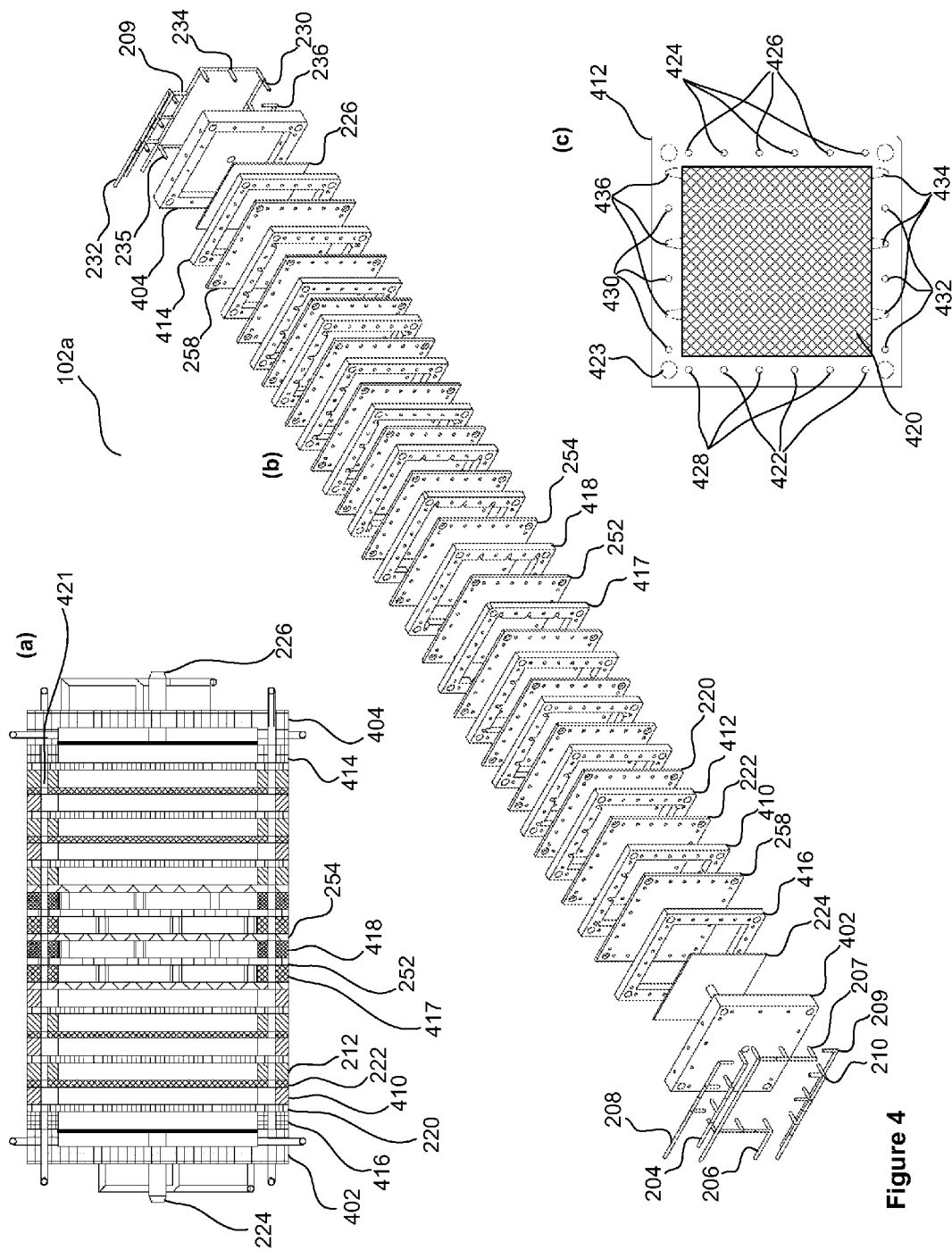
FIGS. 4($a$)-($c$) are various views of the dialytic stack depicted in FIG. 2.

The dialytic stack 102a depicted in FIGS. 2 through 4 are manufactured using a lateral stack of compartments; however, in alternative embodiments the stack 102a may also be formed in a spiral to facilitate manufacturing.

Figure 5:
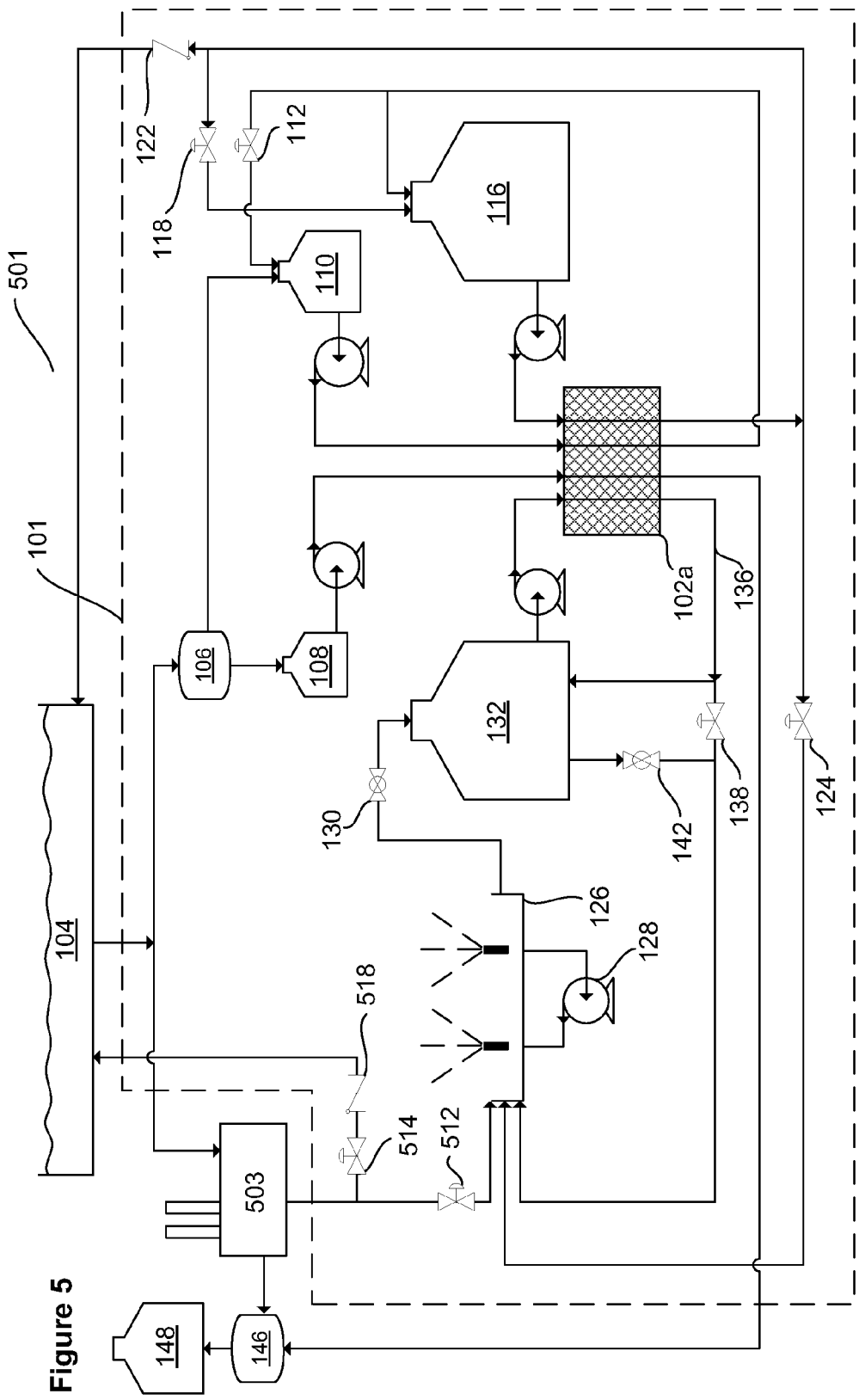
FIG. 5 is a schematic view of one embodiment of a combined desalination plant that is composed of a first desalination plant that outputs brine for use in a second desalination plant that is powered by concentration difference energy.

Referring now to FIG. 5, there is depicted a combined desalination plant 501 that can be used to desalinate saltwater. The combined desalination plant 501 uses the saltwater discharge of a first desalination plant 503 to improve the efficiency and reduce the cost of a CDE desalination plant, such as the plant 101 as introduced in FIG. 1 and as depicted in FIG. 5.

A desalination plant produces brine that has a higher concentration than the saltwater that is input to the desalination plant as the brine contains ions that are removed from the product feed. The brine discharged from large scale seawater desalination plants commonly has a salt concentration by mass of 7% to 8%, which is higher than the diluent-p and diluent-c salt concentrations used in the foregoing embodiments. In the combined desalination plant 501, the brine discharged from the first desalination plant 503 is used to replace the ions lost from the concentrate circuit in the CDE plant 101.

The first desalination plant 503 may utilize technology such as reverse osmosis, MSF, MED, electrodialysis and vapor recompression technology. The first desalination plant 503 is fluidly coupled to the post-treatment system 146, which in turn is fluidly coupled to the storage reservoir 148. The first desalination plant 503 produces freshwater that it sends to the post-treatment system 146 for eventual storage in the storage reservoir 148.

The first desalination plant 503 also produces brine. The brine can be discharged back to the saltwater reservoir 104 through control valve 514 and backflow preventer 518. Alternatively, the brine can be channeled to the reconcentrator 126 of the CDE plant 101 via control valve 512. The volume of brine channeled to the reconcentrator 126 contains enough ions to replace those ions lost from the concentrate circuit as a result of the concentrate being used for desalination in the dialytic stack 102a. If the brine has a higher concentration than the diluent-c, the combined desalination plant 501 reduces the amount of water that is evaporated in the reconcentrator 126 of the CDE plant 101 relative to the CDE plant 101 of FIG. 1, thereby reducing the energy consumed in the reconcentrator 126 of the CDE plant 101 relative to that of the CDE plant 101.

As a result of using the brine from the first desalination plant 503, the saltwater discharge from the CDE plant 101 can be adjusted to have a higher or lower concentration than the brine output from the first desalination plant 503; this is achieved by adjusting the concentration of the diluent-c by modulating valves 112 and 118 as described above. In the embodiment of FIG. 5, the brine discharged from the CDE plant 101 has a concentration equal to the diluent-c concentration because the brine discharge of the CDE plant 101 emanates from the diluent-c circuit. By outputting a lower concentration discharge than the first desalination plant 503, the combined desalination plant 501 mitigates concerns related to discharging relatively high concentration saltwater into the environment. Alternatively, the plant 501 can be configured to output a higher concentration brine than the first desalination plant 503 alone, in which case overall brine volume is decreased. This is particularly beneficial for inland desalination plants, as a lower volume of brine translates to lower costs for handling and otherwise disposing of the brine. In addition, locating the CDE plant 101 near the first desalination plant 503 facilitates cost reductions by allowing the two plants 101, 503 to share infrastructure such as post-treatment systems 146 and water storage or distribution systems 148. Other exemplary shared infrastructure includes saltwater intakes, saltwater outlets, pre-treatment systems, post-treatment systems, power lines, water mains, control systems, and operations staff.

Figure 6:
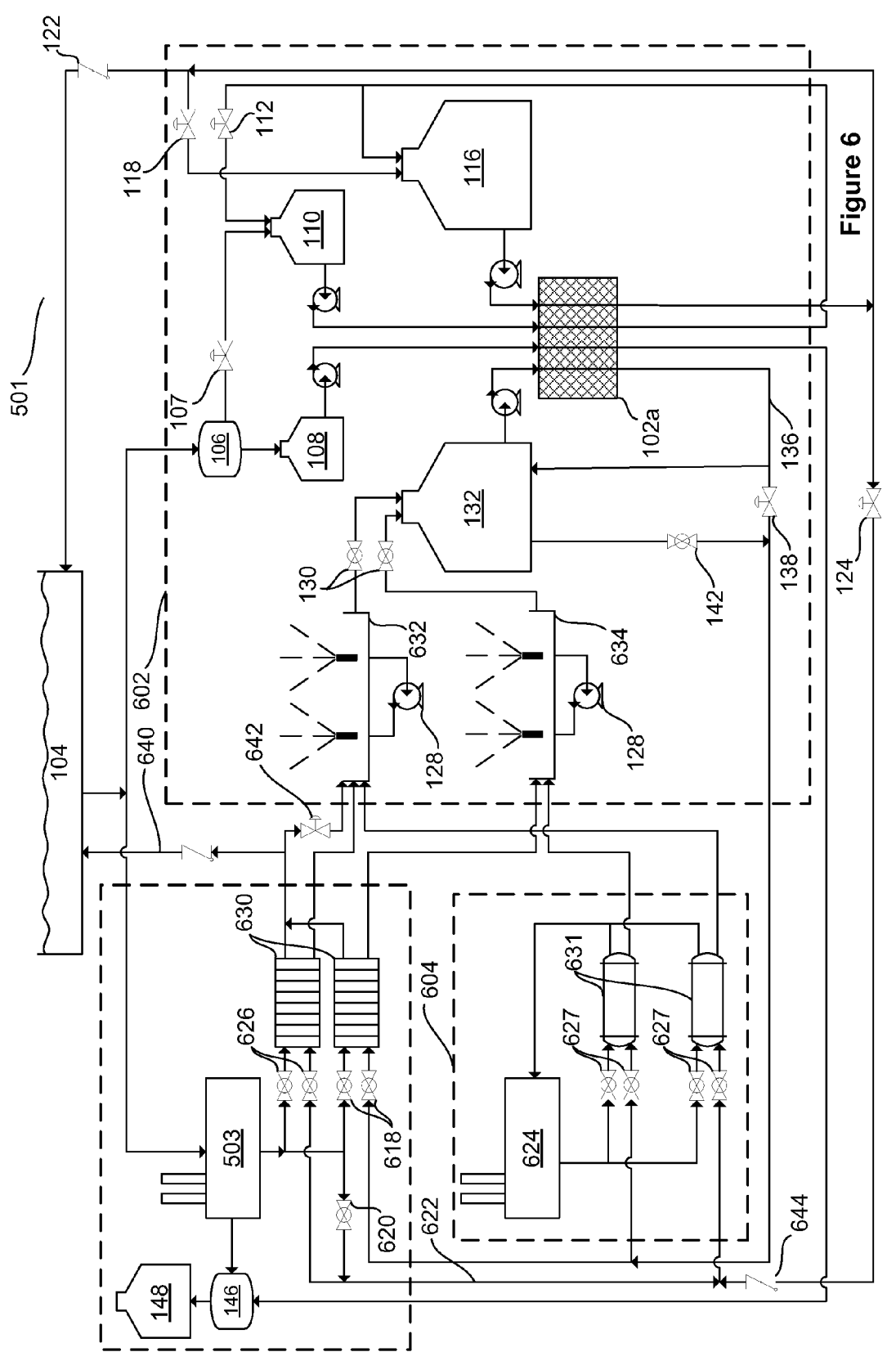

Referring now to FIG. 6, there is depicted a second embodiment of the combined desalination plant 501 that can be used to desalinate saltwater using the brine discharge of the first desalination plant 503 and waste heat from a nearby process plant 604 to improve the efficiency and reduce the cost of the CDE plant 101.

Brine discharged from the first desalination plant 503 is input to a first reconcentrator 632 of the CDE plant 101 via heat exchangers 630. The heat exchangers 630 are fluidly coupled between the first desalination plant 503 and first and second reconcentrators 632, 634 used in the CDE plant 101. The heat exchangers 630 in the first desalination plant 503 beneficially accept diluent-c and concentrate that has passed through the stack 102a of the CDE plant 101, warm them using heat energy obtained from the brine, and then outputs the diluent-c and concentrate to the reconcentrators 632, 634 for re-use in the CDE plant 101. Flow of brine, diluent-c and concentrate into the heat exchangers 630 is controlled by valves 626. The first reconcentrator 632 operates at a lower concentration, receiving both the brine from the first desalination plant 503 and a portion of the diluent-c from the diluent-c reservoir 116 regulated through control valve 124. The first reconcentrator 632 increases the concentration of the brine and diluent-c until it approaches the concentration of the concentrate in the concentrate reservoir 132. Solution from the first reconcentrator 632 is then sent to either the concentrate reservoir 132 or directly to a second reconcentrator 634. The second reconcentrator 634 maintains the concentration and volume of the concentrate by further evaporating water to air. In order to maintain the concentration and volume in the diluent-c circuit, the CDE plant 101 discharges diluent-c to the saltwater reservoir 104. When the salt concentration of the brine discharge of the first desalination plant 503 is greater than the salt concentration of the diluent-c that the CDE plant 101 discharges back to the saltwater reservoir 104, the plant 501 in FIG. 6 has beneficially prevented discharge the saltier brine from the first desalination plant 503 and instead discharges the less salty diluent-c into the environment. Alternatively, as discussed above in respect of FIG. 5, the combined desalination plant 501 may output a saltier brine than the first desalination plant 503 alone, in which case overall brine volume decreases, as does the cost associated with handling or otherwise disposing of the brine.

The process plant 604 of FIG. 6 generates waste heat. The process plant 604 may be a nearby power plant, chemical plant, refinery, or thermal based desalination plant, for example. The waste heat from the process plant 604 is used to preheat the diluent-c and concentrate solutions input to the reconcentrators 632, 634 via additional heat exchangers 630, thereby enhancing the rate at which the reconcentrators 632, 634 can evaporate water to air. The flow rates at which the diluent-c and concentrate pass through the heat exchangers 631 are controlled by valves 627. Exemplary heat exchangers 631 include shell and tube steam condensing units, shell and tube fluid-to-fluid, and plate and frame fluid-to-fluid heat exchangers.

Variations of the embodiment of the combined desalination plant 501 shown in FIG. 6 can depend upon which plants already in place in regions where the CDE plant 101 may be constructed. For example, the first desalination plant 503 may be an MED or MSF plant in which case the brine may have heat content, which could be used to further heat the diluent-c and concentrate sent to the reconcentrators 632, 634.

Figure 7:
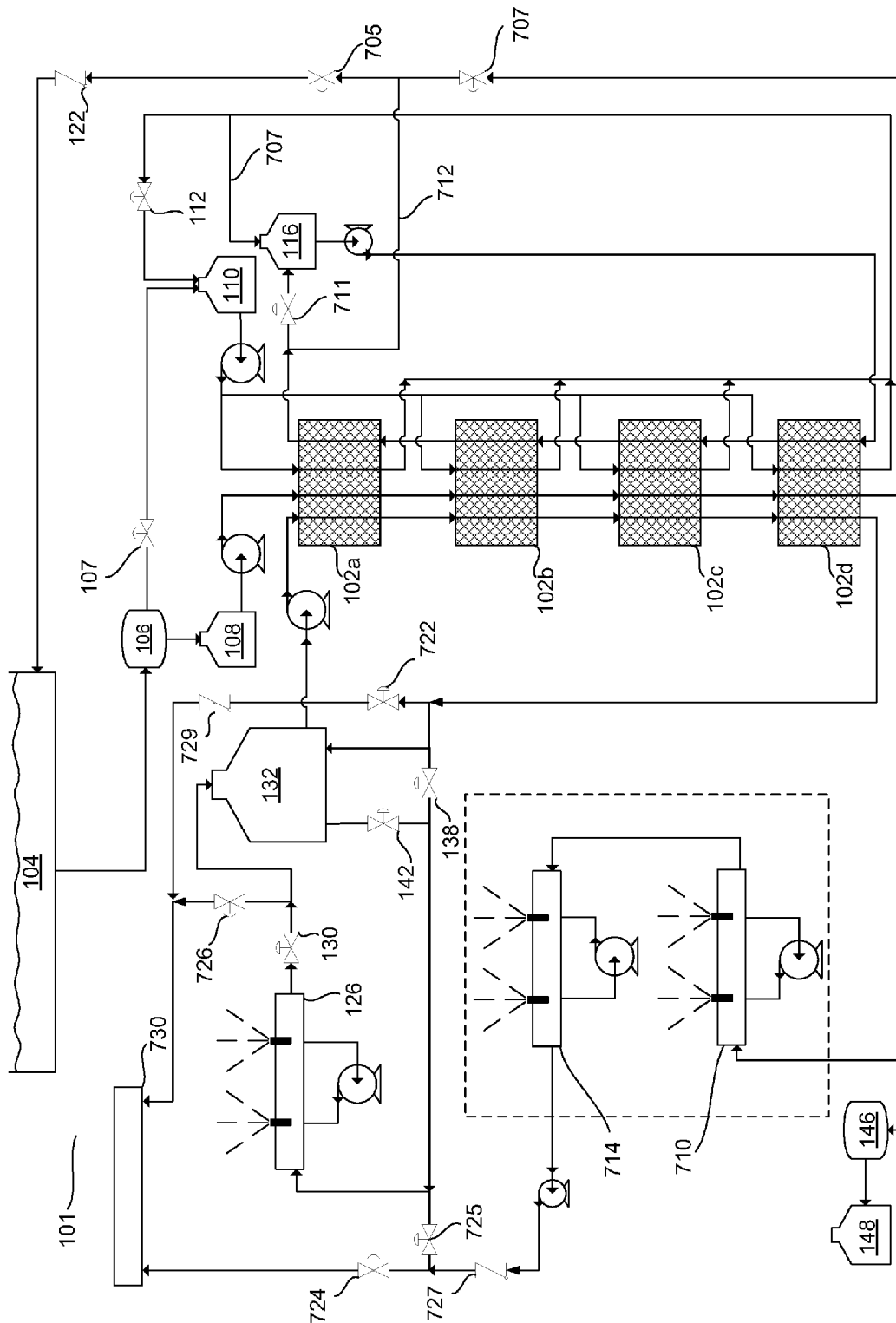
FIGS. 7 and 8 are schematic views of embodiments of the plant of FIG. 1 that output a relatively high concentration brine from that facilitates salt harvesting.

Referring now to FIG. 7, there is depicted an embodiment of the desalination plant 101 that can be used to produce a high concentration saltwater discharge of 12% salt by mass or greater. The plant 101 can be operated to produce freshwater and precipitated salts from the high concentration saltwater discharge, thereby effectively outputting no saltwater discharge. Consequently, the desalination plant 101 as depicted in FIG. 7 is hereinafter interchangeably referred to as a "zero liquid discharge plant."

Desalination of underground saline aquifers presents challenges regarding where to discharge the brine produced during desalination. When ocean water is desalinated, brine is typically returned to the ocean. When an underground aquifer is desalinated, the brine may be sent back down to the saltwater aquifer; however, this increases the salt concentration of the aquifer, making further desalination from the same aquifer more difficult. Being able to reduce the volume of saltwater in the aquifer without returning the brine to the aquifer beneficially creates storage space in the aquifer into which carbon dioxide produced by an external process can be stored, for example.

The brine produced during desalination may be fed to a pond for evaporation such that the salt contained therein can be harvested; however, a desalination plant having a relatively low recovery ratio produces a low concentration brine that requires the pond to have a relatively large surface area to enable timely evaporation. A desalination plant that has a relatively high recovery ratio outputs a higher concentration brine, which allows a pond having a relatively small surface area to achieve timely evaporation. Consequently, the salt contained in the brine discharge from a desalination plant that has a relatively high recovery ratio can be more economically harvested than the salt contained in the brine discharge from a desalination plant having a relatively low recovery ratio. Salt harvesting is economical in that harvested salt can be sold and that salt that is harvested is not discharged into the environment, which may make obtaining regulatory approval for plant construction easier.

In order to produce precipitated salts, it is beneficial to start with a high concentration salt solution of 12% salt mass or greater. The embodiment of the desalination plant 101 depicted in FIG. 7 can produce this high concentration salt solution. The plant 101 passes concentrate and diluent-c in series in counter-current directions through multiple concentration difference energy dialytic stacks 102a-d. As the diluent-c and the concentrate flow in opposite directions, the concentrate decreases in concentration as it flows in one direction through the stacks 102a-d while the diluent-c increases in concentration as it flows in an opposite direction through the stacks 102a-d. Consequently, when the concentrate and the diluent-c exit the stacks 102a-d, they have approached each other in concentration. Thus, prior to mixing the diluent-c with the concentrate, its concentration has increased and therefore less evaporation of water to air is required, and the volumetric flow rate of the diluent-c is decreased while its concentration is increased. The volume and concentration of brine that is discharged from the desalination plant 101 of FIG. 7 is reduced. As discussed in more detail below, the desalination plant 101 of FIG. 7 can be operated to discharge no brine, and instead discharge product and precipitated solid salts. Low volume discharge is particularly important when desalinating brackish water inland, as dealing with brine from such desalination represents a key cost component that increases proportionally with the volume of brine produced.

Product feed from the saltwater reservoir 104 is pumped through four stacks 102a-d in series, desalinating as it passes through each of the stacks 102a-d. While in the depicted embodiment four stacks are used, in alternative embodiments a different number of stacks can be used. The number of stacks is dependent on the size of each of the stacks 102a-d and on the extent of desalination desired. If the product output from the final stack 102d in series does not meet output salinity requirements, a portion of it may be re-circulated back to any of the four stacks 102a-d for further desalination (not shown). Product feed booster pumps between each stack 102a-d may be used (not shown) to maintain the product pressure higher than other fluids and prevent seepage as described above.

In an alternative embodiment (not shown), the diluent-p from the diluent-p reservoir 110 is pumped through the stacks 102a-d in parallel. A portion of the diluent-p output from the stacks 102a-d is fed to the diluent-c reservoir 116 by modulating valve 112. The volume and concentration of the solutions in the diluent-c and diluent-p reservoirs 116, 110 can be adjusted as described above with respect to FIG. 1.

In the plant 101, concentrate from the concentrate reservoir 132 is pumped through the stacks 102a-d in series and decreases in concentration as it progresses through subsequent stacks. The diluent-c is pumped from the diluent-c reservoir 116 through the stacks in a counter-current direction relative to the concentrate; passing first through stack 102d, then stack 102c, then stack 102b, and finally stack 102a; with the diluent-c increasing in concentration in each stack. The counter-current flow method assists in balancing and maintaining the concentration gradient in each of the stacks 102a-d. The diluent-c emerging from the stack 102a has the highest concentration in the diluent-c circuit, while the concentrate emerging from the stack 102d has the lowest concentration in the concentrate circuit; thus the concentrations of diluent-c and concentrate have approached one another without mixing while doing useful work desalinating product feed. Diluent-c booster pumps (not shown) between each of the stacks 102a-d may also be utilized.

A portion of the diluent-c output from the stack 101 is returned to the diluent-c reservoir 116 to maintain its concentration and volume by modulating control valve 711. The remainder is sent through pipe 712, which is then either sent back to the saltwater reservoir 104 through control valve 705 or to the concentrate and salt discharge circuit through control valve 707. Beneficially, the plant 101 can be configured and operated as a zero liquid discharge plant by closing control valve 705 or removing the discharge pipe to saltwater reservoir 104. Any diluent-c not returned to the saltwater reservoir 104 is sent to diluent-c reconcentrators 710, 714 that evaporate water to air to increase the concentration of the diluent-c. FIG. 7 depicts two diluent-c reconcentrators in series: a first reconcentrator 710 and a second reconcentrator 714. The second reconcentrator 714 operates at a higher concentration than the first reconcentrator 710. The concentration of the diluent-c is increased over multiple reconcentration stages, reducing mixing losses between the solution entering either of the reconcentrators 710, 714 and any solution already in the reconcentrators 710, 714. A specified volume of diluent-c is fed to the concentrate circuit by control valve 725, after passing through the diluent-c reconcentrators 710, 714. The specified amount of diluent-c is based on the volume required to replenish salt ions in the concentrate that migrated from the concentrate to the diluent-c and diluent-p in the stacks 102a-d.

In an alternative embodiment (not depicted), the diluent-c reconcentrators 710, 714 are not present and the diluent-c from control valve 707 is sent directly to the concentrate reconcentrator 126; while this alternative embodiment involves lower capital costs than the embodiment depicted in FIG. 7, utilizing it results in higher mixing losses than utilizing the plant 101 depicted in FIG. 7.

The concentrate circuit of the embodiment of the plant 101 of FIG. 7 is similar to the embodiment of the plant 101 of FIG. 1 with respect to the concentrate reservoir 132, concentrate reconcentrator 126, and volume and concentrate control apparatus that includes control valves 130, 138, and 142. The concentrate is pumped through the stacks 102a-d in series and then returned to the concentrate reservoir 132 or reconcentrator 126 with control valve 722 closed. Concentrate booster pumps (not shown) may be used between each of the stacks 102a-d.

The concentrate circuit of the embodiment of the plant 101 of FIG. 7 differs from the embodiment of the plant 101 in FIG. 1 as the plant 101 of FIG. 7 is configured to discharge high concentration saltwater discharge that may be used for harvesting precipitated salts in a salt harvesting device 730. Exemplary salt harvesting devices are similar to exemplary reconcentrators—evaporative ponds, evaporative spray ponds, natural draft evaporative towers, and forced draft evaporative towers—with the ability to shut down the reconcentrator and collect precipitated salts. A single salt harvesting device 730 may be operated in batch mode in combination with sufficient concentrate storage volume, or multiple salt harvesting devices may be operated in batch mode at various concentrations approaching precipitation.

In the embodiment of FIG. 7, the salt harvesting device 730 is fed with solution output from the diluent-c reconcentrators 710, 714 through a backflow preventer 727. Control valve 724 controls the volumetric flow rate of solution to the salt harvesting device 730. Beneficially, when the diluent-c reconcentrators 710, 714 are the sole sources of solution for the salt harvesting device 730, the sole purpose of the concentrate reconcentrator 126 is to produce the concentrate for the dialytic stacks 102a-d.

Solution may also be fed to the salt harvesting device 730 from the concentrate reconcentrator 126 with volumetric flow rate to the salt harvesting device 730 controlled by control valve 726; channeling solution to the salt harvesting device 730 from the concentrate reconcentrator 126 is particularly beneficial during periods of low cost electrical energy or when the volume in the concentrate storage vessel 132 is high. Solution may also be fed to the salt harvesting device 730 from the output from any one or more of the stacks 102a-d through a backflow preventer 729 with volumetric flow rate controlled by control valve 722. Alternatively, solution may also be fed to the salt harvesting device 730 from the concentrate reservoir 132 by closing control valve 138 and opening valves 142, 725 and 724.

Figure 8:
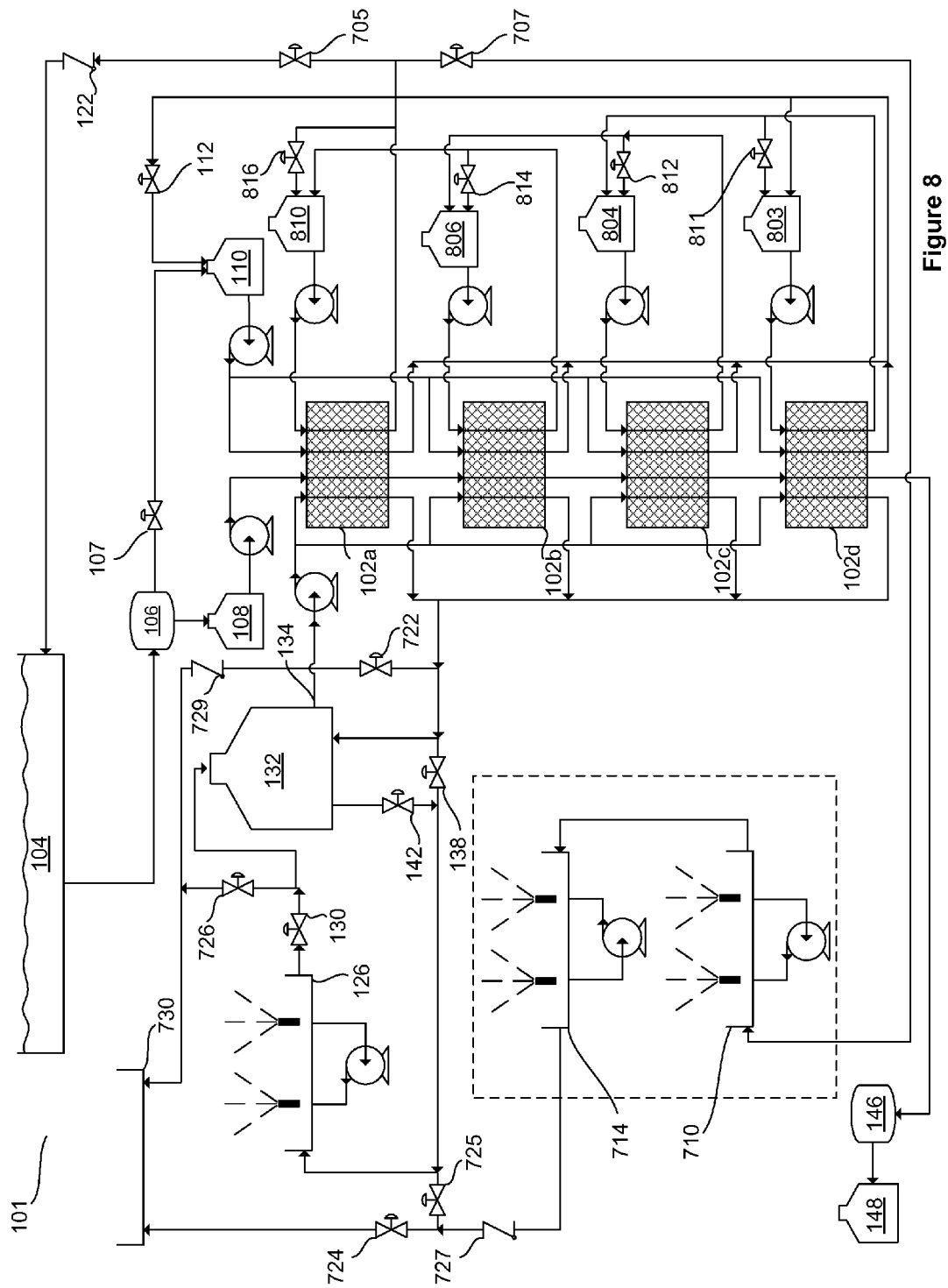

Referring now to FIG. 8, there is depicted another embodiment of the desalination plant 101 that can be used to produce a high concentration saltwater discharge of 12% mass salt or greater. The embodiment of the plant 101 depicted in FIG. 8 is similar to the embodiment of the plant 101 depicted in FIG. 7 with two main differences, as described below.

The first difference between plant 101 depicted in FIG. 8 and the plant 101 of FIG. 7 is that the concentrate is passed through the stacks 102a-d in parallel rather than in series; this helps to maintain the average concentration of the concentrate output from the stacks at a higher level than in the embodiment of FIG. 7, and reduces any need for pumps between the stacks 102a-d. The second difference is that in the plant 101 of FIG. 8, a portion of the diluent-c flowing through the stacks 102a-d is re-circulated to intermediate diluent-c storage vessels 803, 804, 806, and 810. Control valves 811, 812, 814, and 816 are regulated to control the volume and concentration in the diluent-c storage vessels 803, 804, 806, and 810, respectively. Beneficially, the plant 101 of FIG. 8 enables improved control of the concentration of diluent-c entering each of the stacks 102a-d. This method provides the potential to allow plant designers to minimize total cost of ownership for each desalination plant through optimized use of stack membrane area and cost, reconcentrator area and cost, capital cost of balance of plant equipment, and operating costs including energy. For example, increasing the concentration of diluent-c sent to the concentrate circuit through control valves 816 and 707 decreases the amount of water that needs to be evaporated in the reconcentrators, thus decreasing reconcentrator size, cost, and energy draw. However, increasing the concentration of diluent-c reduces the concentration gradient within the stack and thereby reduces the effective use of ion exchange membrane area thus increasing membrane area, cost, and stack pumping energy draw. A minimized total cost of ownership for each desalination plant will depend on site specific conditions such as land costs, equipment and installation costs, and electrical energy costs in addition to more global conditions such as ion exchange membrane cost.

Figure 9:
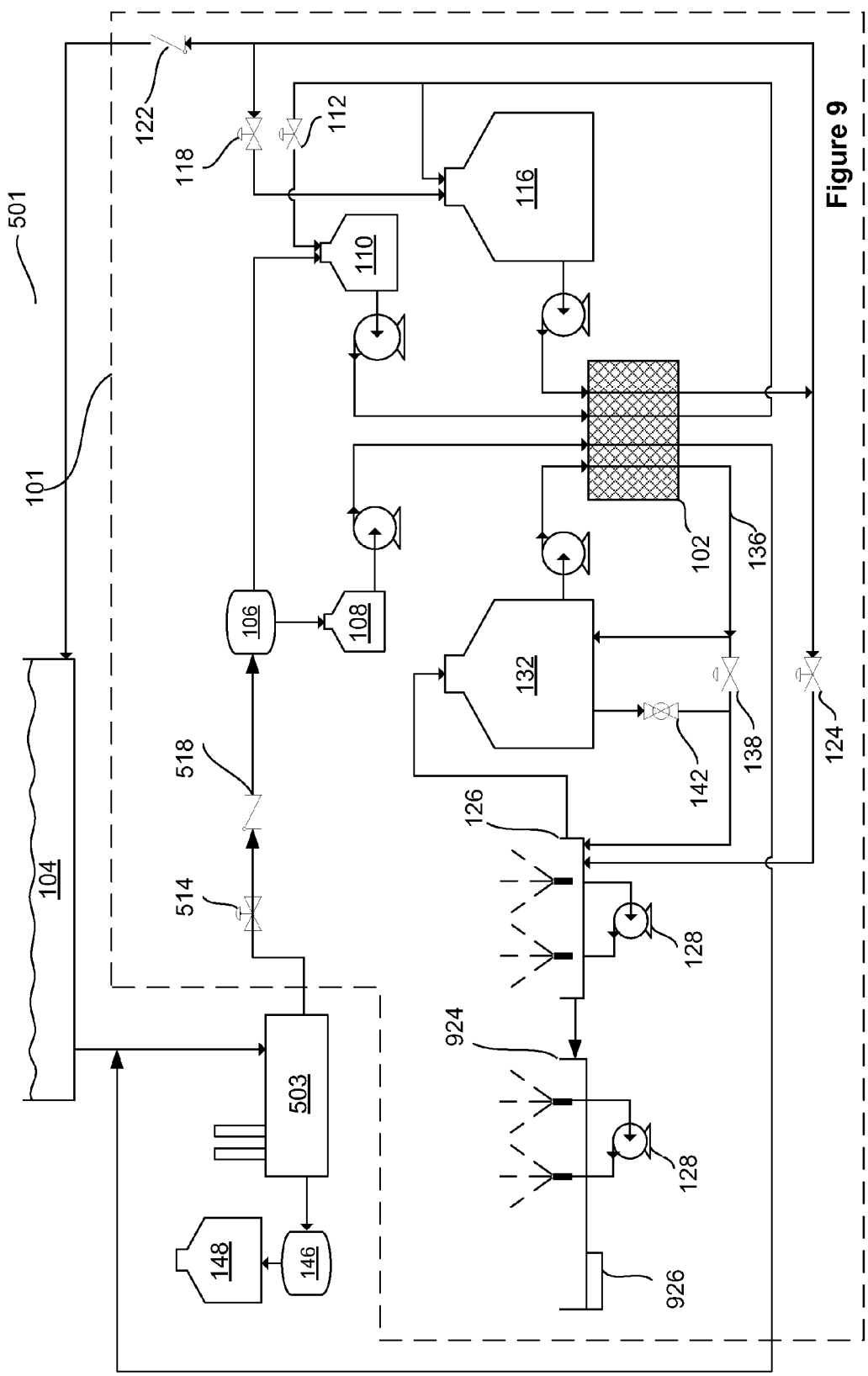
FIG. 9 is a schematic view of a third embodiment of the combined desalination plant of FIG. 5 in which saltwater that has been desalinated is output from the second desalination plant and is returned to the first desalination plant for further desalination.

Referring now to FIG. 9, there is depicted another embodiment of the combined desalination plant 501 that includes the first desalination plant 503 fluidly coupled to the CDE plant 101 such that brine discharged from the first desalination plant 503 is used in the CDE plant 101. In contrast to the embodiment of FIG. 5, brine is not directly channeled from the first desalination plant 503 into the reconcentrator 126 of the CDE plant 101. Instead, the CDE plant 101 uses the brine instead of saltwater obtained from the saltwater reservoir 104. The CDE plant 101 partially desalinates the brine in that it reduces the salt content of the brine, but not to levels suitable for potable, drinking water. The CDE plant 101 and the first desalination plant 503 are fluidly coupled such that partially desalinated brine leaving the CDE plant 101 is returned to the first desalination plant 503 for further desalination.

The combined desalination plant 501 of FIG. 9 is beneficial in that it results in a higher recovery ratio than the first desalination plant 503 is capable of alone; it enables plant designers to design systems in which desalination technology operates at its best economic operating point; and by feeding brine back to the first desalination plant 503, it allows brine discharge volume to be reduced relative to operation of the first desalination plant 503 alone. Decreasing brine volume is beneficial in that a lower volume of brine translates into lower costs associated with disposing or otherwise handling the brine, which is particularly beneficial for inland desalination plants.

Additionally, the effectiveness of desalination technologies such as RO, MED, and MSF is limited by scaling. However, the CDE plant 101 can address scaling by reversing ionic current as discussed above. Furthermore, the CDE plant 101 can remove the larger ionic species that are primarily responsible for scaling, such as $Ca^{2+}$ or $SO_4^{2-}$, efficiently, which is beneficial when desalinated brine is returned to the first desalination plant 503 for further desalination.

In the combined desalination plant 501 of FIG. 9, solid salt may be harvested using a final stage reconcentrator 924 and a sump 926 that are fluidly coupled to the reconcentrator 126. Operating the reconcentrator 126 such that the concentrate solution has a salt concentration of above about 18% can be detrimental in that salt may precipitate within the CDE plant 101. In the embodiment of FIG. 9, the reconcentrator 126 may increase the salt concentration of the concentrate solution to less than 18% and then transfer the concentration solution to the final stage reconcentrator 924, which increases the concentration of the concentrate to above 18%, and more particularly to concentrations higher than about 24%. Precipitated salt can then be removed from the sump 926. Beneficially, this lowers the risk that salt precipitation occurs anywhere in the CDE plant 101 aside from the final stage reconcentrator 924 and the sump 926, and allows salt harvesting to occur in a controlled fashion.

In the foregoing embodiments, the dialytic stacks 102a-d shown in the plants of FIGS. 5 through 9 may utilize the concentrate, diluent and product feed as described in U.S. patent application Ser. No. 12/360,714 instead of concentrate, diluent, discharge solution, and product feed as illustrated in FIGS. 2 and 3. For example, when brine is discharged from the first desalination plant 503 and used in the dialytic stacks 102a-d, such as to form the concentrate (depicted in FIG. 5) or as product feed (depicted in FIG. 9), the dialytic stacks 102a-d may be the "five stream" stack schematically depicted in FIGS. 2 and 3 or the "four stream" stack of U.S. patent application Ser. No. 12/360,714.

The plant 101 of any of the foregoing embodiments can be operated to produce water during periods of high relative humidity or rain. Prior to the period of high relative humidity or rain, the plant 101 can produce excess concentrate for storage and subsequent usage during periods of rain or high relative humidity. During periods of high humidity or rain, the dialytic stack 102a can be operated as a two compartment electrodialysis reversal ("EDR") stack according to methods known to skilled persons. Operating the dialytic stack 102a as an EDR stack will consume more electrical energy than operating the stack 102a using concentration difference energy;

however, when water demand is high it could nonetheless be economically beneficial to do so. It could also be beneficial to operate some, or all, of the stacks 102a-d in this mode during periods when larger volumes of water are required, even during periods of low relative humidity. In forward polarity mode, operating any one of the stacks 102a-d as an EDR stack involves feeding both the diluent-p and diluent-c chambers in parallel with product feed and the concentrate and product feed chambers in parallel with a second saltwater solution ("wash"). An electric field is applied across the anode and cathode similar to conventional EDR. The application of the electric field drives ions from the product feed though the ion exchange membranes to the wash, which desalinates the product feed. When operated as EDR stacks, the stacks 102a-d will be able to produce larger volumes of product in comparison operating the stacks 102a-d as described above in relation to FIGS. 2 and 3. In reverse polarity, both the concentrate and product feed chambers are fed in parallel with the product feed while the diluent-c and diluent-p chambers are fed in parallel with the wash. In this manner, the plant 101 can be operated as an EDR plant to ensure water production capability during periods when the reconcentrator does not function well, or when increased volumes of water are wanted.

In regions with relatively low cost electricity during non-peak hours, the plant 101 of any of the foregoing embodiments may produce and store concentrate for later use. The reconcentrator may be operated during periods of low electricity prices, or the dialytic stack 102a may be operated as an electrodialysis reversal reconcentrator. To operate the stack as an electrodialysis reversal reconcentrator, the stack 102a is operated as described with respect to FIGS. 2 and 3 with the exception that concentrate is pumped through the product feed chambers. When operating in forward polarity, an electric potential is applied to the anode and cathode to force ions from the diluent-p and diluent-c chambers to the concentrate chamber. Operation of the stacks as an electrodialysis reversal reconcentrator increases the concentration of the concentrate and decreases the concentration of the diluent solutions, all of which can be stored for later use.

While particular embodiments have been described in the foregoing, it is to be understood that other embodiments are possible and are intended to be included herein. It will be clear to any person skilled in the art that modifications of and adjustments to the foregoing embodiments, not shown, are possible. For example, although the diluent-c, diluent-p, and concentrate are all saltwater in the foregoing embodiments, in alternative embodiments they may have other ionic solutions dissolved therein.

We claim:

1. A method for desalinating saltwater, comprising:
generating a drive voltage by:
flowing a concentrate solution through a concentrate chamber; and
flowing a diluent solution having an ionic concentration lower than an ionic concentration of the concentrate solution through a diluent chamber, the concentrate and diluent chambers forming a drive cell and sharing one of an anion and cation exchange membrane such that anions or cations flow from the concentrate chamber to the diluent chamber through the exchange membrane;
applying a sufficient voltage that comprises the drive voltage across a first product chamber through which flows the saltwater to be desalinated and that is in ionic communication with the drive cell, wherein the sufficient voltage equals or exceeds a desalination voltage of the first product chamber such that cations and anions respectively migrate from the first product chamber and into a first cation and first anion discharge chamber each bounding the first product chamber and respectively having flowing there through a first cation and first anion discharge solution;
wherein at least one of the first cation and first anion discharge solutions has an ionic concentration lower than the ionic concentration of the diluent solution.

2. A method as claimed in claim 1, wherein the first product chamber shares a first product chamber anion exchange membrane and a first product chamber cation exchange membrane with the first anion discharge chamber and the first cation discharge chamber, respectively, and wherein cations migrate from the first product chamber to the first cation discharge chamber through the first product chamber cation exchange membrane and anions migrate from the first product chamber to the first anion discharge chamber through the first product chamber anion exchange membrane.

3. A method as claimed in claim 1, wherein the diluent solution, the concentrate solution, and the first anion and first cation discharge solutions are all saltwater.

4. A method as claimed in claim 1 wherein the ionic concentration of the first cation discharge solution and the ionic concentration of the first anion discharge solution are both lower than the ionic concentration of the diluent solution.

5. A method as claimed in claim 4, wherein the first anion and first cation discharge solutions are a common discharge solution.

6. A method as claimed in claim 5 further comprising applying the sufficient voltage across a second product chamber through which also flows the saltwater being desalinated and that is in ionic communication with the drive cell, wherein the sufficient voltage equals or exceeds a sum of the desalination voltage of the first product chamber and a desalination voltage of the second product chamber such that cations and anions migrate from the second product chamber and into a second cation and second anion discharge chamber each bounding the second product chamber and having flowing there through a second cation and second anion discharge solution, respectively; and
wherein the cation discharge chamber of one of the product chambers is also the anion discharge chamber of the other of the product chambers.

7. A method as claimed in claim 6, wherein the second anion discharge chamber contains the diluent solution.

8. A method as claimed in claim 6, wherein the ionic concentrations of one or both of the second anion and second cation discharge solutions are less than the ionic concentration of the diluent solution.

9. A method as claimed in claim 6 further comprising periodically de-scaling the chambers by desalinating saltwater by:
flowing the concentrate solution through the diluent chamber;
flowing the diluent solution through the concentrate chamber;
flowing the saltwater to be desalinated through the first cation and first anion discharge chambers;
flowing the first anion discharge solution through the second product chamber; and
flowing the first cation discharge solution through the first product chamber.

10. A method as claimed in claim 1 further comprising when the concentrate solution is below a concentrate concentration threshold, heating the concentrate solution using waste heat from a process plant to facilitate evaporation to air, increasing the ionic concentration of the concentrate solution prior to flowing the concentration solution through the concentrate chamber by evaporating a portion of the concentrate solution to air.

11. A method as claimed in claim 1, wherein the first product chamber is at a higher pressure than the concentrate chamber, the diluent chamber, and the first anion and first cation discharge chambers.

12. A method as claimed in claim 1 further comprising flowing an electrolyte through anode and cathode electrolyte chambers, the anode electrolyte chamber bounded on a first side by an anode stack end ion exchange membrane and bounded on another side by an anode, and the cathode electrolyte chamber bounded on a first side by a cathode stack end ion exchange membrane and bounded on another side by a cathode, the anode and cathode electrolyte chambers ionically communicative with the first product chamber via the anode and cathode stack end ion exchange membranes, respectively, and the anode and cathode electrically communicative with each other such that electrons flow from the anode to the cathode, wherein the anode and cathode electrolyte chambers are at a lower pressure than the concentrate chamber, the diluent chamber, the first anion and first cation discharge chambers, and the product chamber.

13. A method as claimed in claim 1, further comprising utilizing brine output from a desalination plant as a source of the concentrate solution and of the saltwater being desalinated, and wherein following exiting the first product chamber, the saltwater being desalinated is returned to the desalination plant for further desalination.

14. A method as claimed in claim 13, wherein the brine output has an ionic concentration between that of the concentrate solution and the diluent solution.

15. A method as claimed in claim 13, wherein the brine output is used as a source of any one or more of the diluent solution and the first anion and first cation discharge solutions.

* * * * *